US012772978B2

(12) United States Patent
Burton et al.

(10) Patent No.: US 12,772,978 B2
(45) Date of Patent: Oct. 27, 2026

(54) USE OF NITRAPYRIN FOR IMPROVED PLANT GROWTH AND DEVELOPMENT

(71) Applicant: Verdesian Life Sciences U.S., LLC, Cary, NC (US)

(72) Inventors: Amy Burton, Fuquay-Varina, NC (US); Elizabeth Waller, Durham, NC (US); Kuide Qin, Chapel Hill, NC (US)

(73) Assignee: Verdesian Life Sciences U.S., LLC, Cary, NC (US)

( * ) Notice: Subject to any disclaimer, the term of this patent is extended or adjusted under 35 U.S.C. 154(b) by 160 days.

(21) Appl. No.: 18/282,884

(22) PCT Filed: Apr. 13, 2022

(86) PCT No.: PCT/US2022/024544
§ 371 (c)(1),
(2) Date: Sep. 19, 2023

(87) PCT Pub. No.: WO2022/225759
PCT Pub. Date: Oct. 27, 2022

(65) Prior Publication Data

US 2024/0172749 A1 May 30, 2024

Related U.S. Application Data

(60) Provisional application No. 63/176,966, filed on Apr. 20, 2021.

(51) Int. Cl.
*A01N 43/40* (2006.01)
*A01P 21/00* (2006.01)

(52) U.S. Cl.
CPC .............. *A01N 43/40* (2013.01); *A01P 21/00* (2021.08)

(58) Field of Classification Search
CPC ................................ A01N 43/40; A01P 21/00
See application file for complete search history.

(56) References Cited

U.S. PATENT DOCUMENTS

| | | | | |
|---|---|---|---|---|
| 8,043,995 B2 | 10/2011 | Sanders et al. | | |
| 10,059,636 B2 | 8/2018 | Sanders et al. | | |
| 10,336,659 B2 | 7/2019 | Sanders et al. | | |
| 2016/0050921 A1* | 2/2016 | Gygi | ...................... | A01N 25/00 504/292 |
| 2017/0036969 A1 | 2/2017 | Nave et al. | | |
| 2017/0183492 A1 | 6/2017 | Sanders et al. | | |

FOREIGN PATENT DOCUMENTS

| | | |
|---|---|---|
| WO | 2011016898 A2 | 2/2011 |
| WO | 2014160826 A1 | 10/2014 |
| WO | 2015031521 A1 | 3/2015 |

OTHER PUBLICATIONS

Bai-Zhao, Ren et al., "Effects of urea mixed with nitrapyrin on leaf photosynthetic and senescence characteristics of summer maize (*Zea mays* L.) waterlogged in the field." Journal of Integrative Agriculture, 2020, vol. 19, No. 6, pp. 1586-1595 (Year: 2020).*
How many soybean plants per acre—Google Search (Year: 2025).*
Range of nitrapyrin soybean application examples kg_ha—Google Search (Year: 2025).*
Nitrapyrin concentration—Google Search (Year: 2025).*
Potato plants per ha1'Google Search (Year: 2025).*
Nitrapyrin potato range application kg_ha—Google Search (Year: 2025).*
Leaf spad value—Google Search (Year: 2025).*
International Search Report for PCT/US2022/024544 with a mailing date of Aug. 1, 2022.
Du Jardin, Patrick, Report on Biostimulants, Contract 30-CE0455515/00-96, Apr. 2012.
Du Jardin, Patrick, "Plant biostimulants: Definition, Concept, Main Categories and Regulation",Scientia Horticulturae 196 (2015) 3-14.
Meikle, Richard W. et al., The Hydrolysis and Photolysis Rates of Nitrapyrin in Dilute Aqueous Solution, Arch. Environ. Contam. Toxicol. 7, 149-158 (1978).
Ren,Bai-Zhao et al., "Effects of urea mixed with nitrapyrin on leaf photosynthetic and senescence characteristics of summer maize (*Zea mays* L.) waterlogged in the field." Journal of Integrative Agriculture , 2020, vol. 19, No. 6, pp. 1586-1595.
Nozari, Reza et al., "Investigating the effect of different tillage methods and nitrapyrin on increasing nitrogen utilization efficiency on physiological and biochemical traits in different wheat cultivars." Archives of Pharmacy Practice, 2020, vol. 11, Issue SI, pp. 134-150.
Dawar, Khadim et al., "Nitrification inhibitor and plant growth regulators improve wheat yield and nitrogen use efficiency." Journal of Plant Growth Regulation, Jan. 22, 2021(Online), <DOI: 10.1007/s0 0344-020-10295-x>.
Ailin, X., "Yield Increase by Nitrogen Fertilizer Synergist 2-Chloro-6-(trichloromethyl)pyridine", Soil, 1979, pp. 223-225.
Wu, X., et al. "Effects of 2-chloro-6-(trichloromethyl)pyridine on yield and agronomic characters of sweet corn", Guangdong Agricultural Sciences, 2016, pp. 86-91, vol. 43, Issue 11.

* cited by examiner

*Primary Examiner* — Robert A Wax
*Assistant Examiner* — John W Lippert, III
(74) *Attorney, Agent, or Firm* — KATTEN MUCHIN ROSENMAN LLP

(57) ABSTRACT

The present invention is directed to biostimulant compositions containing nitrapyrin and finding particular utility in agricultural uses, e.g., being directly applied to soil and/or plant parts, alone or in combination with fertilizers to promote plant growth. More particularly, the subject matter is directed to methods of applying nitrapyrin at an effective rate that is much lower than rates typically used to elicit nitrification inhibition when applied to target areas containing plants of cultivated crops.

20 Claims, 2 Drawing Sheets

USE OF NITRAPYRIN FOR IMPROVED PLANT GROWTH AND DEVELOPMENT

FIELD

The present invention is directed to nitrapyrin-containing compositions of formulations thereof finding particular utility as biostimulants to promote plant growth and development.

BACKGROUND

As the world population is continuously increasing over the year so is the worldwide food demand. As such, there is a continuous ongoing effort to develop new methods and products that improve the output of global agricultural production. Nowadays, agronomic practices such as soil tillage, controlling water usage and managing plant populations in addition to the usage of various fertilizers are some of the tools employed to achieve increased plant growth and productivity in the field. Unfortunately, the use of various fertilizer products over the years to enhance crop yields to meet the growing food demand of the world population has resulted in many long-term environmental consequences such as resource depletion, environmental damage, and negative health effects on our wild and aquatic life.

Therefore, recent efforts in the agricultural industry have focused on developing alternative products and processes aimed to limit the use of these conventional products thereby reducing their negative impact on the environment. For example, biostimulants are currently employed to enhance crop productivity by increasing crop production and improving crop nutritional value while reducing the ecological impact. Plant biostimulants are substances and materials, with the exception of nutrients and pesticides, which, when applied to plants, seeds or growing substrates in specific formulations, have the capacity to modify physiological processes of plants in a way that provides potential benefits to growth, development and/or stress response (Du Jardin P 2012, The Science of Plant Biostimulants). Advantageously, biostimulants can be applied in much smaller quantities compared to other substances that promote plant growth. e.g., nutrients (Jardin et al. Scientia Horticulturae 196 (2015), 3-14).

Various biostimulants can promote the growth and development of plants throughout the entire life cycle. From seed germination to plant maturity, they can improve the efficiency of plant metabolism leading to increased growth, greater yields, and better quality. Biostimulants have been shown to (a) increase plant tolerance and response to abiotic stresses; (b) facilitate the uptake, transport, and assimilation of nutrients; (c) improve the quality of agricultural production, including sugar content, color and fruit size. (d) regulate and improve the water content of plants; and (e) increase certain physicochemical properties of the soil thereby promoting the development of beneficial microorganisms in the field.

Thus, in order for the global agricultural production to keep up with the constant increase in food demand due to the increase in the world population, the need for developing new methods and products is constant.

In this context, it is a primary objective of the present invention to provide eco-friendly products and methods for modulating various plant processes (i.e., improving plant growth, plant productivity, fruit quality, quality of produce, plant yield, plant response to abiotic stress and plant resistance to diseases or to infections). These and additional advantages are described in more detail below.

BRIEF SUMMARY

In one aspect, the subject matter described herein is directed to a method of promoting plant growth of cultivated plants, the method comprising the steps of: a.) obtaining a biostimulant composition comprising nitrapyrin; and b.) applying the biostimulant composition to a target area, wherein the biostimulant composition is applied in an amount effective to cause a biostimulating effect, and wherein the method promotes plant growth of cultivated plants present in the target area.

In further embodiments, the subject matter described herein is directed to amounts and rates effective to cause a biostimulating effect, amounts of nitrapyrin present in the biostimulant composition, and application methods of the biostimulant composition to the target area, as well as application to specific types of cultivated plants present in a given target area.

These and other embodiments and/or aspects are fully described in more detail below.

DETAILED DESCRIPTION

Figure 1:
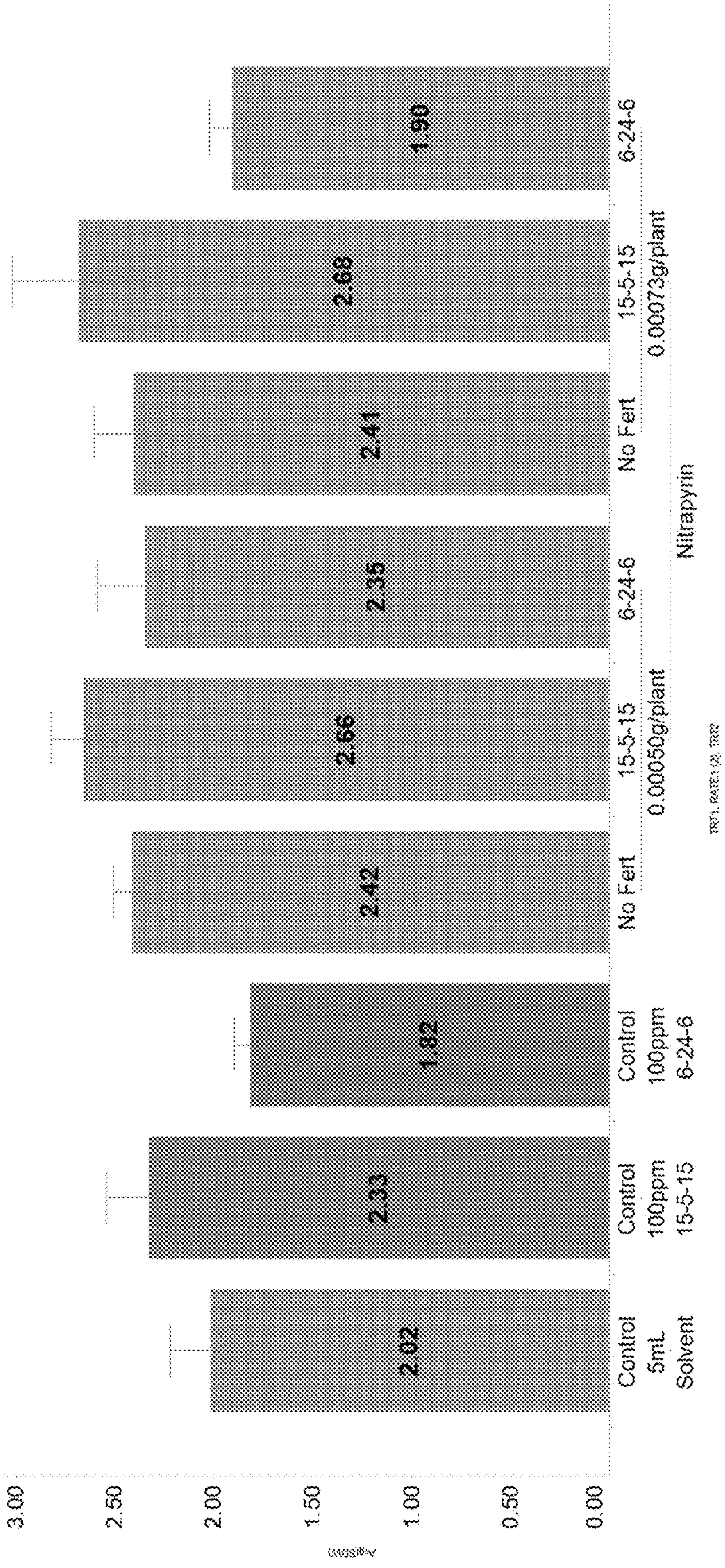
FIG. 1 is a bar graph showing the shoot dry weight of 14-day-old corn seedlings. Nitrapyrin was applied to the soil at two different label rates with and without NPK fertilizers with guaranteed analysis of 15-5-15 and 6-24-6.

The presently disclosed subject matter will now be described more fully hereinafter. However, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims. In other words, the subject matter described herein covers all alternatives, modifications, and equivalents. In the event that one or more of the incorporated literature, patents, and similar materials differs from or contradicts this application, including but not limited to defined terms, term usage, described techniques, or the like, this application controls. Unless otherwise defined, all technical and scientific terms used herein have the same meaning as commonly understood by one of ordinary skill in this field. All publications, patent applications, patents, and other references mentioned herein are incorporated by reference in their entirety.

It was surprisingly discovered that nitrapyrin, a known nitrification inhibitor, can exhibit biostimulant properties when applied at lower concentrations/label rates compared to concentrations/label rates that are typically employed when using nitrapyrin as a nitrification inhibitor. This particular concentration-dependent biological behavior of nitrapyrin has not yet been observed and was unexpected.

Not to be bound by theory, but it is believed that at such low concentrations/label rates nitrapyrin is not present in sufficient quantities to act as a nitrification inhibitor and instead exhibits biostimulatory behavior towards plants, which is expressed as an improvement in plant growth and/or vigor.

In addition, the compositions and methods described herein have advantageously been shown to provide desirable properties for the use of nitrapyrin in agriculture by formulating nitrapyrin complexes with polyanions. The properties include, but are not limited to: low cost, very low application rate, ease of preparation, excellent environmental and toxicology profiles, and non-liquid dosage forms.

Such nitrapyrin-containing biostimulant compositions are described further in more detail below.

I. Definitions

As used herein, the term "complex" or "complex substance" refers to chelates, coordination complexes, charge transfer complexes, and salts of nitrapyrin, wherein nitrapyrin associates with the acidic functional group of polyanion(s) (e.g., —COOH, —$SO_3H$, —$PO_3H$) in a covalent (i.e., bond forming) or noncovalent (i.e., ionic) manner. In a complex a central moiety or ion (e.g., nitrapyrin) associates with a surrounding array of bound molecules or ions known as ligands or complexing agents (e.g., polyanion(s)). The central moiety binds to or associates with several donor atoms of the ligand, wherein each donor atom is a different atom but is the same type of atom (e.g., oxygen (O)). Ligands or complexing agents bound to the central moiety through several of the ligand's donor atoms forming multiple bonds (i.e., 2, 3, 4 or even 6 bonds) are referred to as polydentate ligands. Complexes with polydentate ligands are called chelates. Typically, complexes of central moieties with ligands are increasingly more soluble than the central moiety by itself because the ligand(s) that surround(s) the central moiety do(es) not dissociate from the central moiety once in solution and solvate(s) the central moiety thereby promoting its solubility.

As used herein, the term "salt" refers to chemical compounds consisting of an assembly of cations and anions. Salts are composed of related numbers of cations (positively charged ions) and anions (negative ions) so that the product is electrically neutral (without a net charge). Many ionic compounds exhibit significant solubility in protic solvents such as water or other polar solvents. The solubility is dependent on how well each ion interacts with the solvent.

As used herein, the terms "charge-transfer complex (CT complex)" or "electron-donor-acceptor complex" is an association of two or more molecules, or of different parts of one large molecule, in which a fraction of electronic charge is transferred between the molecular entities. The resulting electrostatic attraction provides a stabilizing force for the molecular complex. The source molecule from which the charge is transferred is called the electron donor and the receiving species is called the electron acceptor. The nature of the attraction in a charge-transfer complex is not a stable chemical bond, and is thus much weaker than covalent forces.

As used herein, the term "biostimulant" refers to a compound stimulating plant physiology or metabolism independent of the compound's nutrient content, with the main aim of improving one or more of the following characteristics of the plant:plant growth, developmental progression, nutrient use efficiency, tolerance to abiotic stress, crop quality, or yield.

As used herein, the term "soil" is to be understood as a natural body comprised of nonliving matter (e.g., minerals and organic matter (e.g., organic compounds in varying degrees of decomposition), liquid, and gases) and living organisms (e.g., microorganisms (such as bacteria and fungi), animals and plants) that occurs on the land surface, and is characterized by layered horizons that are distinguishable from the initial material as a result of various physical, chemical, biological, and anthropogenic processes. From an agricultural point of view, soils are predominantly regarded as the anchor and primary nutrient base for plants.

As used herein, the term "fertilizer" is to be understood as chemical compounds applied to promote plant growth, development, and yield. Fertilizers are typically applied either through the soil (for uptake by plant roots) or by foliar spray (for uptake through leaves). The term "fertilizer" can be subdivided into two major categories: a) organic fertilizers (composed of decayed plant/animal matter) and b) inorganic fertilizers (composed of chemicals and minerals). Organic fertilizers include compost, manure, slurry, worm castings, seaweed, sewage, and guano. Green manure crops are also regularly grown to add nutrients (especially nitrogen) to the soil. Processed organic fertilizers include compost, blood meal, bone meal and seaweed extracts. Further examples are enzymatically digested proteins, fish meal, and feather meal. The decomposing crop residue from prior years is another source of fertility. In addition, naturally occurring minerals such as mine rock phosphate, sulfate of potash and limestone are also considered inorganic fertilizers. Inorganic fertilizers are usually manufactured through chemical processes (such as the Haber-Bosch process), also using naturally occurring deposits, while chemically altering them (e.g., concentrated triple superphosphate). Naturally occurring inorganic fertilizers include Chilean sodium nitrate, mine rock phosphate, and limestone.

As used herein, the term "manure" is organic matter used as organic fertilizer in agriculture. Depending on its structure, manure can be divided into liquid manure, semi-liquid manure, stable or solid manure and straw manure. Depending on its origin, manure can be divided into manure derived from animals or plants. Common forms of animal manure include feces, urine, farm slurry (liquid manure) or farmyard manure (FYM) whereas FYM also contains a certain amount of plant material (typically straw), which may have been used as bedding for animals. Animals from which manure can be used comprise horses, cattle, pigs, sheep, chickens, turkeys, rabbits, and guano from seabirds and bats. The application rates of animal manure when used as fertilizer highly depend on the origin (type of animals). Plant manures may derive from any kind of plant whereas the plant may also be grown explicitly for the purpose of plowing them in (e.g., leguminous plants), thus improving the structure and fertility of the soil. Furthermore, plant matter used as manure may include the contents of the rumens of slaughtered ruminants, spent hops (left over from brewing beer) or seaweed.

As used herein, the term "NPK fertilizer" stands for a fertilizer containing "nitrogen, phosphorus, and potassium," the three nutrients that compose complete macronutrient fertilizers. In some instances you will see a series of numbers behind the letters NPK, e.g., 6-24-6. These numbers correspond, respectively, to the nitrogen content, phosphorus content, and potassium content of that fertilizer. Also implied is a percentage symbol after each number because each of the three numbers represents the percentage of that nutrient in the makeup of the fertilizer.

As used herein, the term "seed" refers to the fertilized, matured ovule consisting of an embryonic plant together with a store of food, all surrounded by a protective coat. A seed (in some plants, referred to as a kernel) is a small embryonic plant enclosed in a covering called the seed coat, usually with some stored food.

As used herein, the term "plant parts" refers to various different parts of the plants such as the root, leaves, stem, fruit, flower, and seed.

As used herein, the term "reduce volatility" and the like refer to the volatility of the nitrapyrin salt as compared to that of the nitrapyrin free base. The reduction in volatility can be quantified as described elsewhere herein.

As used herein, the term "organic solvent" refers to a nonaqueous solvent that solvates the nitrapyrin complex to the degree as described elsewhere herein.

As used herein, the term "nonaqueous" refers to a solvent that has a water content of less than 0.2% by weight based on the total weight of the solvent.

Throughout this specification and the claims, the words "comprise," "comprises," and "comprising" are used in a nonexclusive sense, except where the context requires otherwise, and are synonymous with "including," "containing," or "characterized by," meaning that it is open-ended and does not exclude additional, unrecited elements or method steps.

Additional definitions may follow below.

II. Biostimulant Composition

The biostimulant composition disclosed herein comprises nitrapyrin. Nitrapyrin is a widely used nitrification inhibitor in agriculture having the structure:

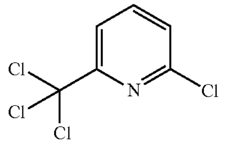 [SMILES: Clc1cccc(C(Cl)(Cl)Cl)n1]

Nitrapyrin typically functions to inhibit nitrification within the soil bacteria, *Nitrosomonas*, which act on ammonia by oxidizing ammonium ions to nitrite and/or nitrate. Nitrification inhibition therefore reduces nitrogen emissions from soil. Nitrapyrin has been used for many years as a nitrification inhibitor either alone or co-applied with stabilized nitrogen-containing fertilizers to maintain agriculturally applied ammonium nitrogen in the ammonium form.

To date, nitrapyrin products for delaying nitrification of ammoniacal and urea fertilizers include N-Serve® 24 (launched in 1976) and Instinct® (launched in 2009), which are typically applied at rates ranging from about 2.35 L/Ha to about 5.41 l/Ha (or from about 32 oz/acre to about 74 oz/acre) depending on the type of crop.

However, it has been surprisingly discovered that when nitrapyrin-containing compositions (such as commercially available nitrapyrin products) are applied to plants at much lower application rates than 45.4 grams of nitrapyrin per acre, a biostimulating effect can be observed. In particular, the nitrapyrin-containing compositions disclosed herein exhibit a biostimulating effect when used at an application rate that is equal to or lower than 45.4 grams of nitrapyrin per acre. Not to be bound by theory, but it is believed that at such label rates, adequate nitrification inhibition cannot be achieved and instead a biostimulating effect on plants is observed. Thus, the observed improvement in plant growth is not due to nitrification inhibition but rather due to biostimulation.

The effective amount of nitrapyrin to elicit such a biostimulating effect can vary depending on various factors. In some embodiments, the biostimulant composition comprises nitrapyrin in an amount of from about 1% to about 50%, from about 5% to about 45%, from about 10% to about 40%, from about 15% to about 35%, or from about 20% to about 30% by weight based on the total weight of the biostimulant composition. In some embodiments, the biostimulant composition comprises nitrapyrin in an amount of from about 1% to about 30%, from about 5% to about 25%, from about 8% to about 20%, from about 12% to about 25%, or from about 15% to about 23% by weight based on the total weight of the biostimulant composition. In some embodiments, the biostimulant composition comprises nitrapyrin in an amount of from about 15% to about 50%, from about 20% to about 50%, from about 25% to about 50%, from about 25% to about 45%, from about 30% to about 45%, or from about 30% to about 40% by weight based on the total weight of the composition.

In some embodiments, the nitrapyrin is neat (meaning it is in its natural and/or original state without being in contact with any other substances such as, but not limited to, solvents, other additional ingredients (e.g., for formulation purposed), and/or other agricultural products) In some embodiments, the nitrapyrin is not neat but is a nitrapyrin-containing commercially available composition. Exemplary nitrapyrin-containing commercially available compositions include, but are not limited to, N-Serve® and/or Instinct® II.

In some embodiments, the nitrapyrin is in a free base form. In some embodiments, the nitrapyrin is not in its free base form but in a salt form. Exemplary salts of nitrapyrin include any salt forms known in the art, such as, but not limited to, chlorides, bromides, iodide, phosphate, sulfonate salts, and the like. In some embodiments, the nitrapyrin is complexed with a polyanion.

Complexes of nitrapyrin include those formed with a suitable non-volatile polyanionic species. Polyanionic species include those polyanionic polymers disclosed in WO 2011/016898; WO 2015/031521; US2017/0183492; U.S. Pat. Nos. 10,336,659 and 10,059,636, each of which is incorporated by reference in its entirety. Polyanionic species also include a non-polymeric molecule having two or more negatively charged groups. Suitable negatively charged groups include, but are not limited to, carboxyl groups, sulfonate groups, phosphonate groups, and mixtures thereof.

Polyanions (polyanionic species) suitable for formation of useful complexes with nitrapyrin have one or more of: a formal charge of −2 or greater (i.e., greater negative charge) in dilute aqueous solution at pH 10, lower vapor pressure when compared to the vapor pressure of nitrapyrin, and/or lower volatility when compared to the volatility of nitrapyrin. In some embodiments, the vapor pressure of the nitrapyrin in the nitrapyrin complex is less than 0.5 mmHg at 20° C. Furthermore, the amount of loading of the nitrapyrin into a formulation has been significantly increased.

In some embodiments, the MW/charge ratio of a polyanion is 45-200, 45-175, 45-150, 45-125, 45-115, 45-110, 45-105, 45-100, 45-95, 45-90, 45-85, 45-80, 45-75, 50-200, 50-175, 50-150, 50-125, 50-115, 50-110, 50-105, 50-100, 50-95, 50-90, 50-85, 50-80, 50-75, 65-200, 65-175, 65-150, 65-125, 65-115, 65-110, 65-105, 90-115, 90-100, 90-105, 95-120, 95-115, 95-110, 95-105, 50, 55, 60, 65, 70, 75, 80, 85, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 1127, 128, 129, or 130. In some embodiments, the charge ratio (molecular weight/charge) is less than 200, less than 175, less than 150, less than 140, less than 130, less than 125, less than 120, less than 115, less than 110, less than 105, less than 100, less than 95, less than 90, less than 85, less than 80, less than 75, or less than 70. In some embodiments, the MW/charge ratio of a polyanion is greater than 50, greater than 55, greater than 60, greater than 65, greater than 70, greater than 75, greater than 80, greater than 85, greater than 90, greater than 95, or greater than 100.

A number of polyanionic species are suitable for the formation of complexes with nitrapyrin. In some embodiments, the polyanion has a formal charge greater than −2, greater than −3, greater than −4, greater than −5, greater than −6, greater than −7, greater than −8, greater than −9, greater than −10, greater than −15, or greater than −20 at pH 10. As used herein, greater than "−n" means greater negative charge, e.g., −3 has greater negative charge than −2. In some embodiments, the polyanions are polymeric materials having a plurality (two or more) of anionic functional groups, including, but not limited to, carboxylates, sulfonates, and the like.

In some embodiments, the polyanion is a non-polymeric molecule having a plurality (two or more) of anionic functional groups, including, but not limited to, carboxylates, sulfonates, and the like. Non-polymeric polyanions include, but are not limited to, di-, tri-, tetra-, penta-, hexa-, hepta-, octa-, nona-, and decacarboxyls, di-, tri-, tetra-, penta-, hexa-, hepta-, octa-, nona-, and decasulfonates, and di-, tri-, tetra-, penta-, hexa-, hepta-, octa-, nona-, and decaphosphonates. In some embodiments, a non-polymeric polyanion comprises an aliphatic dibasic acid. In some embodiments, a non-polymeric polyanion comprises aromatic carboxylic acid containing 2-6 carboxylic acid groups. In some embodiments, a non-polymeric polyanion comprises aliphatic carboxylic acid containing 2-6 carboxylic acid groups. Exemplary non-polymeric polycarboxylic acids, phosphonates, and aromatic carboxylic acids suitable for forming nitrapyrin complexes include, but are not limited to, malic acid, tartaric acid, etidronic acid, succinic acid, adipic acid, isophthalic acid, aconitic, trimesic, biphenyl-3,3',5,5'-tetracarboxylic acid, furantetracarboxylic acid, sebacic acid, azelaic acid, isoterephtallic acid, isophthallic acid, pyromellitic acid, and mellitic acid.

The amount of nitrapyrin substitution on the polyanion is from about 5% to about 90%, of the available anionic groups, or from about 10% to about 90% of the available anionic groups, or from about 20% to about 90% of the available anionic groups, or from about 30% to about 80% of the available anionic groups, or from about 40% to about 80% of the available anionic groups, or from about 40% to about 75% of the available anionic groups, or from about 50% to about 75% of the available anionic groups. In some embodiments, the nitrapyrin complex contains from about 50 g/mol anionic species to about 200 g/mol anionic species; or from about 75 g/mol anionic species to about 190 g/mol anionic species, or from about 100 g/mol anionic species to about 180 g/mol anionic species, or about 125 g/mol anionic species to about 175 g/mol anionic species.

In some embodiments, the polyanionic species comprises a polyanionic polymer. In some embodiments, a polyanionic polymer comprises a copolymer containing two or more different repeat units. A copolymer can have two, three, four, or more different repeat units. As used herein, a copolymer contains two or more different repeat units. As used herein, a terpolymer contains three or more different repeat units. As used herein, a tetrapolymer contains four or more different repeat units. A polyanionic polymer can be, but is not limited to, random copolymer, alternating copolymer, periodic copolymer, statistical copolymer, or block copolymer. In some embodiments, the polyanion can be a carboxylated polymer, a sulfonated polymer or an all-sulfonated polymer. An all-sulfonated polymer can be, but is not limited to, polystyrene sulfonate. Additionally, the sulfur can be provided by polyanionic species such as ethanedisulfonic acid and 1,3-benzenedisulfonic acid.

In some embodiments, the polyanionic polymers have a high carboxylate content and sulfonate repeat units, which are very soluble in water and biodegradable. In some embodiments, a polyanionic polymer has a single repeating unit, wherein the repeating unit contains a negatively charged group. In some embodiments, a polyanionic polymer comprises a copolymer having two or more repeating units wherein at least one of the repeating units contains a negatively charged group. In some embodiments, a polyanionic polymer comprises a dipolymer having two repeating units wherein at least one or both of the repeating units contains a negatively charged group. In some embodiments, a polyanionic polymer comprises a terpolymer having three or more repeating units wherein at least one of the repeating units contains a negatively charged group. In some embodiments, the polyanionic polymers are tetrapolymers having at least four different repeat units distributed along the lengths of the polymer chains, preferably with at least one repeat unit each of maleic, itaconic, and sulfonate repeat units. The repeat units are derived from corresponding monomers used in the synthesis of the polymers. In some embodiments, a polyanionic polymer contains type B, type C, and/or type G repeat units as described in detail below. In some embodiments, a polyanionic polymer contains type B and type C, type B and type G, or type C and type G repeat units as described in detail below. In some embodiments, a polyanionic polymer contains at least one repeat unit from each of three separately defined categories of repeat units, referred to herein as type B, type C, and type G repeat units, and described in detail below. In some embodiments, at least about 90 mole percent of the repeat units therein are selected from the group consisting of type B, C, and G repeat units, and mixtures thereof, the repeat units being randomly located along the polyanionic polymer. In some embodiments, the polyanionic polymer contains no more than about 10 mole percent or no more than 5 mole percent of any of (i) non-carboxylate olefin repeat units, (ii) ether repeat units, (iii) non-sulfonated monocarboxylic repeat units, (iv) non-sulfonated monocarboxylic repeat units, and/or (v) amide-containing repeat units. "Non-carboxylate" and "non-sulfonated" refer to repeat units having essentially no carboxylate groups or sulfonate groups in the corresponding repeat units.

In some embodiments, a polyanionic polymer comprises a copolymer comprising the structure represented by:

$$\text{poly}(A_a\text{-co-}A'_{a'}\text{-co-}A''_{a''}\text{-co-}D_d)$$

wherein A is a first repeat unit containing a negatively charged group, A' is optional and if present is a second repeat unit containing a negatively charged group, A" is optional and if present is a third repeat unit containing a negatively charged group, and D is optional and if present is an uncharged repeat unit. A polyanionic polymer can contain additional negatively charged repeat units or uncharged repeat units, a is an integer greater than or equal to 1, a', a", and d are integers greater than or equal to zero. The value of (a+a'+a") is greater than or equal to 2.

In some embodiments, the polyanionic polymer comprises a random copolymer having structure represented by:

poly($B_b$-co-$C_c$-co-$G_g$-co-$G'_{g'}$)

wherein B and C are type B and type C repeat units as described below, G and G' are independently type G repeat units as described below, c is an integer greater than zero and b, g and g' are integers greater than or equal to zero. In some embodiments, the ratio of b:c:(g+g') is about 1-70:1-80:0-65. In some embodiments, the ratio of b:c:(g+g') is about 20-65:15-75:1-35. In some embodiments, the ratio of b:c:(g+g') is about 35-55:20-55:1-25. In some embodiments, the ratio of b+c to g+g' is about 0.5-20:1, about 1-20:1, or about 1-10:1. In some embodiments, the ratio of b:c:g:g' is about 10:90:0:0, about 60:40:0:0, about 50:50:0:0, or about 0:100:0:0. In some embodiments, the ratio of b:c:g:g' is about 45:35:15:5. In some embodiments, the ratio of b:c:g:g' is about 45:50:4:1. In some embodiments, the polymers contain less than 10%, less than 4%, less than 3%, less than 25, less than 1%, less than 0.5%, less than 0.1%, less than 0.05%, less than 0.01% or 0% repeat units that are not B, C, G, or G'.

In some embodiments, the polyanionic polymer comprises a tetrapolymer having repeat units individually and independently selected from the group consisting of type B, type C, and type G repeat units, and mixtures thereof, described in detail below. In some embodiments, a tetrapolymer contains more than four different repeat units. In some embodiments, the additional repeat units are selected from the group consisting of type B, type C, and type G repeat units, and mixtures thereof, as well as other monomers or repeat units not being type B, C, or G repeat units.

In some embodiments, a polyanionic polymer contains at least one repeat unit from each of the B, C, and G types, one other repeat unit selected from the group consisting of type B, type C, and type G repeat units, and optionally other repeat units not selected from type B, type C, and type G repeat units. In some embodiments, polyanionic polymers comprise a single type B repeat unit, a single type C repeat unit, and two different type G repeat units, or two different type B repeat units, a single type C repeat unit, and one or more different type G repeat units.

In some embodiments, the polyanionic polymers comprise at least 90% or at least 96 mole percent of the repeat units therein selected from the group consisting of type B, C, and G repeat units, and mixtures thereof. In some embodiments, the polyanionic polymers consist of or consist essentially of repeat units selected from the group consisting of type B, C, and G repeat units, and mixtures thereof. In some embodiments, the polyanionic polymers contain <3, <2, <1, <0.5, <0.1, <0.05, <0.01, or 0 mole percent ester groups and/or non-carboxylate olefin groups.

In some embodiments, the total amount of type B repeat units in the polymer is from about 1 to about 70 mole percent, the total amount of type C repeat units in the polymer is from about 1 to about 80 mole percent, and the total amount of type G repeat units in the polymer is from about 0.1 to about 65 mole percent, where the total amount of all of the repeat units in the polymer is taken as 100 mole percent. In some embodiments, the total amount of type B repeat units in the polymer is from about 20 to about 65 mole percent, the total amount of type C repeat units in the polymer is from about 15 to about 75 mole percent, and the total amount of type G repeat units in the polymer is from about 1 to about 35 mole percent, where the total amount of all of the repeat units in the polymer is taken as 100 mole percent.

In some embodiments, the polyanionic polymers have one type B repeat unit, one type C repeat unit, and two different type G repeat units. In some embodiments, the one type B repeat unit is derived from maleic acid, the one type C repeat unit is derived from itaconic acid, and two type G repeat units are respectively derived from methallylsulfonic acid and allylsulfonic acid. In such polymers, the type B repeat unit can be present at a level of from about 35 to about 55 mole percent, the type C repeat unit can present at a level of from about 20 to about 55 mole percent, the type G repeat unit derived from methallylsulfonic acid can present at a level of from about 1 to about 25 mole percent, and the type G repeat unit derived from allylsulfonic acid can be present at a level of from about 1 to about 25 mole percent, where the total amount of all of the repeat units in the polymer is taken as 100 mole percent. In other embodiments, the polyanionic polymers comprise two different type B repeat units, one type C repeat unit, and one type G repeat unit. In some embodiments, the polyanionic polymer contains at least one repeat unit not selected from the group consisting of type B, type C, and type G repeat units.

In some embodiments, the mole ratio of the type B and type C repeat units in combination to the type G repeat units (that is, the mole ratio of (B+C)/G) should be about 0.5-20:1, about 2:1-20:1, or about 2.5:1-10:1. Still further, the polymers should be essentially free (e.g., less than about 1 mole percent) of alkyloxylates or alkylene oxide (e.g., ethylene oxide)-containing repeat units, and most desirably entirely free thereof.

In some embodiments, the polyanionic polymers have a high percentage of the repeat units thereof bearing at least one anionic group, e.g., at least about 80 mole percent, at least about 90 mole percent, at least about 95 mole percent, or essentially all of the repeat units contain at least one anionic group. It will be appreciated that the B and C repeat units have two anionic groups per repeat unit, whereas the preferred sulfonate repeat units have one anionic group per repeat unit.

In some embodiments, a polyanionic terpolymer comprises a polymer backbone composition range (by mole percent, using the parent monomer names of the corresponding repeat units) of: maleic acid 35-50%; itaconic acid 20-55%; methallylsulfonic acid 1-25%; and allylsulfonic sulfonic acid 1-20%, where the total amount of all of the repeat units in the polymer is taken as 100 mole percent.

The molecular weight of the polymers can be varied, depending upon the desired properties. The molecular weight distribution for any of the polyanionic polymers can be measured by size exclusion chromatography. In some embodiments, a polyanionic polymer has a molecule weight greater than 118, greater than 150, greater than 200, greater than 300, greater than 400, or greater than 500 Da. In some embodiments, the polyanionic polymers have a molecular weight of about 100-50,000 Da. In some embodiments, the polyanionic polymers have a molecular weight of about 100-5,000 Da, about 200-5000 Da, about 400-5,000 Da, or about 1,000-5,000 Da. In some embodiments, at least 90% of the finished polyanionic polymer is at or above a molecular weight of about 100, 200, 400, or 1,000 measured by size exclusion chromatography in 0.1 M sodium nitrate solution via refractive index detection at 35° C. using polyethylene glycol standards. Other methods of determining polymer molecular known in the art can also be employed.

Type B Repeat Units

Type B repeat units can be selected from the group consisting of repeat units derived from substituted and unsubstituted monomers of maleic acid and/or maleic anhydride, fumaric acid, mesaconic acid, mixtures of the foregoing, and any isomers, esters, acid chlorides, and partial or complete salts of any of the foregoing. Type B repeat units may be substituted with one or more $C_1$-$C_6$ straight or branched chain alkyl groups substantially free of ring structures and halo atoms, wherein substantially free means no more than about 5 mole percent or no more than about 1 mole percent of either ring structures or halo substituent. Substituents are normally bound to one of the carbons of a carbon-carbon double bond of the monomer(s) employed.

Those skilled in the art will appreciate the usefulness of in situ conversion of acid anhydrides to acids in a reaction vessel just before or even during a reaction. However, it is also understood that when corresponding esters (e.g., maleic or citraconic esters) are used as monomers during the initial polymerization, this should be followed by hydrolysis (acid or base) of pendant ester groups to generate a final carboxylated polymer substantially free of ester groups.

Type C Repeat Units

Type C repeat units can be selected from the group consisting of repeat units derived from substituted or unsubstituted monomers of itaconic acid or itaconic anhydride, and any isomers, esters, and the partial or complete salts of any of the foregoing and mixtures of any of the foregoing. Type C repeat units may be substituted with one or more $C_1$-$C_6$ straight or branched chain alkyl groups substantially free of ring structures and halo atoms.

The itaconic acid monomer used to form type C repeat units has one carboxyl group, which is not directly attached to the unsaturated carbon-carbon double bond used in the polymerization of the monomer. In some embodiments, a type C repeat unit has one carboxyl group directly bound to the polymer backbone, and another carboxyl group spaced by a carbon atom from the polymer backbone. The definitions and discussion relating to "substituted," "salt," and useful salt-forming cations (metals, amines, and mixtures thereof) with respect to the type C repeat units are the same as those set forth for the type B repeat units.

In some embodiments, the type C repeat unit is an unsubstituted itaconic acid or itaconic anhydride, either alone or in various mixtures. If itaconic anhydride is used as a starting monomer, it is normally useful to convert the itaconic anhydride monomer to the acid form in a reaction vessel just before or even during the polymerization reaction. Any remaining ester groups in the polymer are normally hydrolyzed, so that the final carboxylated polymer is substantially free of ester groups.

Type G Repeat Units

Type G repeat units can be selected from the group consisting of repeat units derived from substituted or unsubstituted sulfonated monomers possessing at least one carbon-carbon double bond and at least one sulfonate group and which are substantially free of aromatic rings and amide groups, and any isomers, and the partial or complete salts of any of the foregoing, and mixtures of any of the foregoing. Type G repeat units may be substituted with one or more $C_1$-$C_6$ straight or branched chain alkyl groups substantially free of ring structures and halo atoms.

In some embodiments, type G repeat units can be selected from the group consisting of $C_1$-$C_8$ straight or branched chain alkenyl sulfonates, substituted forms thereof, and any isomers or salts of any of the foregoing; especially preferred are alkenyl sulfonates selected from the group consisting of vinyl, allyl, and methallylsulfonic acids or salts.

In some embodiments, the type G repeat units are derived from vinylsulfonic acid, allylsulfonic acid, and methallylsulfonic acid, either alone or in various mixtures. It has also been found that alkali metal salts of these acids are also highly useful as monomers. In this connection, it was unexpectedly discovered that during polymerization reactions yielding the novel polymers disclosed herein, the presence of mixtures of alkali metal salts of these monomers with acid forms thereof does not inhibit completion of the polymerization reaction. By the same token, mixtures of monomers of maleic acid, itaconic acid, sodium allyl sulfonate, and sodium methallyl sulfonate do not inhibit the polymerization reaction.

Syntheses of BC and BCG polymers are described in WO 2015/031521, incorporated herein by reference in its entirety.

1. Class I Polymers

Class IA Polymers

Class IA polymers contain both carboxylate and sulfonate functional groups, but are not the tetra- and higher order polymers of Class I. For example, terpolymers of maleic, itaconic, and allylsulfonic repeat units will function as the polyanionic polymer component of the formulation. The Class IA polymers thus are normally homopolymers, copolymers, and terpolymers, advantageously including repeat units individually and independently selected from the group consisting of type B, type C, and type G repeat units, without the need for any additional repeat units. Such polymers can be synthesized in any known fashion, and can also be produced using the previously described Class I polymer synthesis.

Class IA polymers preferably have the same molecular weight ranges and the other specific parameters (e.g., pH and polymer solids loading) previously described in connection with the Class I polymers, and may be converted to partial or complete salts using the same techniques described with reference to the Class I polymers. Class IA polymers are most advantageously synthesized using the techniques described above in connection with the Class I polymers.

2. Class II Polymers

Broadly speaking, the polyanionic polymers of this class are of the type disclosed in U.S. Pat. No. 8,043,995, which is incorporated herein by reference in its entirety. The polymers include repeat units derived from at least two different monomers individually and respectively taken from the group consisting of what have been denominated for ease of reference as B' and C' monomers; alternately, the polymers may be formed as homopolymers or copolymers from recurring C' monomers. The repeat units may be randomly distributed throughout the polymer chains.

In detail, repeat unit B' is of the general formula

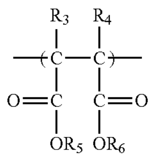
or
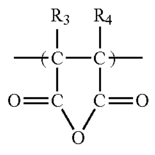
or

-continued

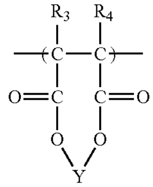

and repeat unit C is of the general formula

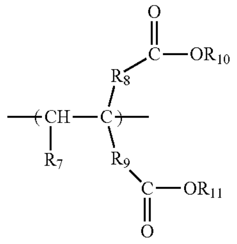

or

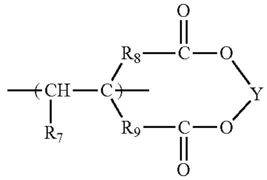

or

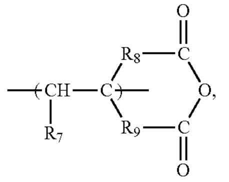

wherein each $R_7$ is individually and respectively selected from the group consisting of H, OH, $C_1$-$C_{30}$ straight, branched chain and cyclic alkyl or aryl groups, $C_1$-$C_{30}$ straight, branched chain and cyclic alkyl or aryl formiate ($C_0$), acetate ($C_1$), propionate ($C_2$), butyrate ($C_3$), etc., up to $C_{30}$ based ester groups, R'$CO_2$ groups, OR' groups and COOX groups, wherein R' is selected from the group consisting of $C_1$-$C_{30}$ straight, branched chain and cyclic alkyl or aryl groups and X is selected from the group consisting of H, the alkali metals, $NH_4$ and the $C_1$-$C_4$ alkyl ammonium groups, $R_3$ and $R_4$ are individually and respectively selected from the group consisting of H, $C_1$-$C_{30}$ straight, branched chain and cyclic alkyl or aryl groups, $R_5$, $R_6$, $R_{10}$ and $R_{11}$ are individually and respectively selected from the group consisting of H, the alkali metals, $NH_4$ and the $C_1$-$C_4$ alkyl ammonium groups, Y is selected from the group consisting of Fe, Mn, Mg, Zn, Cu, Ni, Co, Mo, V, W, the alkali metals, the alkaline earth metals, polyatomic cations containing any of the foregoing (e.g., $VO^{+2}$), amines, and mixtures thereof, and $R_8$ and $R_9$ are individually and respectively selected from the group consisting of nothing (i.e., the groups are nonexistent), $CH_2$, $C_2H_4$, and $C_3H_6$.

As can be appreciated, the Class II polymers typically have different types and sequences of repeat units. For example, a Class II polymer comprising B' and C' repeat units may include all three forms of B' repeat units and all three forms of C' repeat units. However, for reasons of cost and ease of synthesis, the most useful Class II polymers are made up of B' and C' repeat units. In the case of the Class II polymers made up principally of B' and C' repeat units, $R_5$, $R_6$, $R_{10}$, and $R_{11}$ are individually and respectively selected from the group consisting of H, the alkali metals, $NH_4$, and the $C_1$-$C_4$ alkyl ammonium groups. This particular Class II polymer is sometimes referred to as a butanedioic methylenesuccinic acid copolymer and can include various salts and derivatives thereof.

The Class II polymers may have a wide range of repeat unit concentrations in the polymer. For example, Class II polymers having varying ratios of B':C' (e.g., 10:90, 60:40, 50:50 and even 0:100) are contemplated and embraced by the presently disclosed subject matter. Such polymers would be produced by varying monomer amounts in the reaction mixture from which the final product is eventually produced and the B' and C' type repeat units may be arranged in the polymer backbone in random order or in an alternating pattern.

The Class II polymers may have a wide variety of molecular weights, ranging, for example, from 500 to 5,000,000, depending chiefly upon the desired end use. Additionally, n can range from about 1 to about 10,000 and more preferably from about 1 to about 5,000.

Class II polymers can be synthesized using dicarboxylic acid monomers, as well as precursors and derivatives thereof. For example, polymers containing mono- and dicarboxylic acid repeat units with vinyl ester repeat units and vinyl alcohol repeat units are contemplated; however, polymers principally comprised of dicarboxylic acid repeat units are preferred (e.g., at least about 85%, and more preferably at least about 93%, of the repeat units are of this character). Class II polymers may be readily complexed with salt-forming cations using conventional methods and reactants.

In some embodiments, the Class II polymers are composed of maleic and itaconic B' and C' repeat units and have the generalized formula:

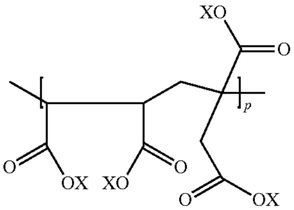

where X is either H or another salt-forming cation, depending upon the level of salt formation.

In a specific example of the synthesis of a maleic-itaconic Class II polymer, acetone (803 g), maleic anhydride (140 g), itaconic acid (185 g) and benzoyl peroxide (11 g) were stirred together under inert gas in a reactor. The reactor provided included a suitably sized cylindrical jacketed glass reactor with mechanical agitator, a contents temperature measurement device in contact with the contents of the reactor, an inert gas inlet, and a removable reflux condenser. This mixture was heated by circulating heated oil in the reactor jacket and stirred vigorously at an internal temperature of about 65-70° C. This reaction was carried out over a period of about 5 hours. At this point, the contents of the reaction vessel were poured into 300 g water with vigorous mixing. This gave a clear solution. The solution was subjected to distillation at reduced pressure to drive off excess solvent and water. After sufficient solvent and water have been removed, the solid product of the reaction precipitates from the concentrated solution, and is recovered. The solids are subsequently dried in vacuo.

In some embodiments, the polyanionic polymer has repeat unit molar composition of 45 mole percent maleic repeat units, 50 mole percent itaconic repeat units, 4 mole percent methallylsulfonate repeat units, and 1 mole percent allylsulfonate repeat units. This polymer is referred to herein as the "T5" polymer.

In some embodiments, the polyanionic polymer comprises: 45% maleic repeat units, 35% itaconic repeat units, 15% methallylsulfonate repeat units, and 5% allylsulfonate repeat units.

In some embodiments, the polyanionic polymers comprises: 45% maleic repeat units, 50% itaconic repeat units, 4% methallylsulfonate repeat units, and 1% allylsulfonate repeat units.

In some embodiments, a nitrapyrin complex can be formed with two or more different polyanionic polymers.

In some embodiments, nitrapyrin can be present as a mixture of the complex and the free form. The ratio of complex to free form can be from 1000:1 to 0.1:1 such that the compositions can reduce the volatilization losses of nitrapyrin to atmosphere by at least 10% as compared to an identical composition lacking the complex described herein. Accordingly, the compositions described herein can simultaneously comprise the complex and the free form so long as the volatilization losses are reduced as described elsewhere herein.

Generally, nitrapyrin and/or complexes thereof can be used neat or can include an organic solvent, as well as other ingredients to form useful formulations.

In some embodiments, the described compositions and/or formulations (which are described in more detail below) contain relatively little to no water. Compositions and/or formulations containing high amounts of water have shown rapid degradation of nitrapyrin and therefore the exposure of nitrapyrin to excessive amounts of water should be minimized. In some embodiments, the amount of water present in neat nitrapyrin (or nitrapyrin-containing compositions) or in a formulation thereof is less than about 10%, about 9%, about 8%, about 7%, about 6%, about 5%, about 4%, about 3%, about 2%, about 1%, or is less than 0.5% w/w based on the total weight of the compositions and/or formulation. In such compositions and/or formulations, the chemical stability of the nitrapyrin is at least about 50%, about 60%, about 70%, about 80%, about 85%, about 90%, about 91%, about 92%, about 93%, about 94%, about 95%, about 96%, about 97%, about 98%, about 99%, or at least about 99.5%. See, for example, Meikle et al., "The hydrolysis and photolysis rates of nitrapyrin in dilute aqueous solution," Arch. Environ. Contam. Toxicol. 7, 149-158 (1978).

III. Biostimulant Formulations

The biostimulant compositions disclosed herein can be formulated with an organic solvent and/or other additional ingredients to generate formulations as described in more detail below.

A. Organic Solvents

In some embodiments, nitrapyrin is formulated with an organic solvent. In some embodiments, the organic solvent is a polar organic solvent. In some embodiments, the polar organic solvent is EPA-approved. EPA-approved solvents are those that are approved for food and non-food use and found in the electronic code of federal regulations, for example in Title 40, Chapter I, Subchapter E, Part 180. EPA-approved solvents include, but are not limited to, the solvents listed in Table 1.

TABLE 1

| EPA-approved solvents | |
|---|---|
| 1,3-Propanediol (CAS Reg. No. 504-63-2) | Isopropyl-3-hydroxybutyrate (CAS Reg. No. 54074-94-1) |
| 2-Ethylhexanol | Kerosene, U.S.P. reagent |
| 2-methyl-1,3-propanediol (CAS Reg. No. 2163-42-0) | Lactic acid |
| 2-Methyl-2,4-pentanediol | Lactic acid, 2-ethylhexyl ester (CAS Reg. No. 6283-86-9) |
| Acetic anhydride | Lactic acid, n-propyl ester, (S); (CAS Reg. No. 53651-69-7) |
| Acetone (CAS Reg. No. 67-64-1) | Mesityl oxide |
| Ammonium hydroxide | Methyl 5-(dimethylamino)-2-methyl-5-oxopentanoate (1174627-68-9) |
| Amyl acetate | Methyl alcohol |
| Benzyl acetate (CAS Reg. No. 140-11-4) | Methyl esters of fatty acids derived from edible fats and oils |
| $C_{10-11}$ rich aromatic hydrocarbons (CAS Reg. No. 64742-94-5) | Methyl isobutyl ketone |
| $C_{11-12}$ rich aromatic hydrocarbons (CAS Reg. No. 64742-94-5) | Methyl isobutyrate (CAS Reg. No. 547-63-7) |
| $C_9$ rich aromatic hydrocarbons (CAS Reg. No. 64742-95-6) | Methyl n-amyl ketone (CAS Reg. No. 110-43-0) |
| Choline chloride (CAS Reg. No. 67-48-1) | Mineral oil |
| Cod liver oil | Morpholine 4-$C_{6-12}$ Acyl Derivatives (CAS Reg. No. 887947-29-7) |
| Cyclohexane | n-Butanol (CAS Reg. No. 71-36-3) |
| Cyclohexanone | n-Butyl benzoate (CAS Reg. No. 136-60-7) |
| Decanamide, N,N-dimethyl (CAS Reg. No. 14433-76-2) | n-Butyl-3-hydroxybutyrate (CAS Reg. No. 53605-94-0) |
| Diethylene Glycol (CAS No. 111-46-6) | n-Decyl alcohol (CAS Reg. No. 112-30-1) |
| Diethylene glycol mono butyl ether (CAS Reg. No. 112-34-5) | n-Hexyl alcohol (CAS Reg. No. 111-27-3) |
| Diethylene Glycol MonoEthyl Ether (CAS Reg. No. 111-90-0) | N-Methylpyrrolidone (CAS Reg. No. 872-504) |
| Diethylphthalate | n-Octyl alcohol (CAS Reg. No. 111-87-5) |
| Diisopropyl adipate (CAS Reg. No. 6938-94-9) | n-Propanol |

TABLE 1-continued

| EPA-approved solvents | |
|---|---|
| Dimethyl adipate (CAS Reg. No. 627-93-0) | Octanamide, N,N-dimethyl (CAS Reg. No. 1118-92-9) |
| Dimethyl glutarate (CAS Reg. No. 1119-40-0) | Oxo-decyl acetate (CAS reg. No. 108419-33-6) |
| Dimethyl succinate (CAS Reg No. 106-65-0) | Oxo-heptyl acetate (CAS Reg. No. 90438-79-2) |
| Dimethyl sulfoxide (CAS No. 67-68-5) | Oxo-hexyl acetate (CAS Reg. No. 88230-35-7) |
| Di-n-butyl carbonate (CAS Reg. No. 542-52-9) | Oxo-nonyl acetate (CAS Reg. No. 108419-34-7) |
| Dipropylene glycol | Oxo-octyl acetate (CAS Reg. No. 108419-32-5) |
| Distillates, (Fishcher-Tropsch), heavy, $C_{18}$-$C_{50}$, branched, cyclic and linear (CAS Reg. No. 848301-69-9) | Oxo-tridecyl acetate (CAS Reg. No. 108419-35-8) |
| d-Limonene (CAS Reg. No. 5989-27-5) | Petroleum hydrocarbons, light odorless conforming to 21 CFR 172.884 |
| Edible fats and oils. | Phenol |
| Ethyl acetate | Propanoic acid, 2-methyl-, monoester with 2,2,4-trimethyl-1,3-pentanediol (CAS Reg. No. 25265-77-4) |
| Ethyl alcohol | Propylene glycol |
| Ethyl esters of fatty acids derived from edible fats and oils | Propylene glycol monomethyl ether (CAS No. 107-98-2) |
| Ethylene glycol (CAS Reg. No. 107-21-1) | Soybean oil-derived fatty acids |
| Glycerol mono-, di-, and triacetate | Tall oil fatty acid (CAS Reg. No. 61790-12-3) |
| Hydrochloric acid | Tetraethylene glycol (CAS Reg. No. 112-60-7) |
| Isobornyl acetate | Toluenesulfonic acid |
| Isobutyl Acetate (CAS Reg. No. 110-19-0) | Triacetin (glyceryl triacetate) |
| Isobutyl isobutyrate (CAS Reg. No. 97-85-8) | Xylene |
| Isobutyric Acid (CAS Reg. No. 79-31-2) | γ-Butyrolactone |
| Isopropyl myristate (CAS Reg. No. 110-27-0) | |

In some embodiments, the organic solvent is a polar aprotic solvent. In some embodiments, the organic solvent is a polar aprotic solvent selected from acetonitrile, dimethyl sulfoxide, acetone, tetrahydrofuran, dimethylformamide, dichloromethane, ethyl acetate, nitromethane, propylene carbonate, and a combination thereof. In some embodiments, the organic solvent is a polar aprotic solvent selected from acetonitrile, dimethyl sulfoxide or a combination thereof.

In some embodiments, the organic solvent is selected from a sulfone, a sulfoxide, an oil, an aromatic solvent, a halogenated solvent, a glycol-based solvent, a fatty acid-based solvent, an acetate-containing solvent, a ketone-containing solvent, an ether polyol-containing solvent, an amide-containing solvent, and combinations thereof. In some embodiments, the one or more organic solvents are all relatively free of water. In some embodiments, the organic solvent contains less than about 10% w/w, about 9% w/w, about 8% w/w, about 7% w/w, about 6% w/w, about 5% w/w, about 4% w/w, about 3% w/w, about 2% w/w, about 1% w/w, about 0.9% w/w, about 0.8% w/w, about 0.7% w/w, about 0.6% w/w, about 0.5% w/w, about 0.4% w/w, about 0.3% w/w, or less than about 0.1% w/w of water based on the total weight of the solvent. In some embodiments, the organic solvent is a liquid at 20° C.

In some embodiments, the organic solvent is a sulfone. A sulfone solvent can be, but is not limited to, sulfolane, methyl sulfolane (3-methyl sulfolane), and dimethylsulfone, and a combination thereof. In some embodiments, the organic solvent is a sulfoxide. A sulfoxide solvent can be, but is not limited to, dimethyl sulfoxide.

In some embodiments, the organic solvent is an ether polyol. An ether polyol solvent can be, but is not limited to, polyethylene glycols, polypropylene glycols, polyalkylene glycols, and related compounds. In some embodiments, the polyethylene glycol has two terminal alcohols (e.g., polyethylene glycol 3350). Exemplary polyethylene glycols include, but are not limited to, diethylene glycol, triethylene glycol, and a combination thereof. Exemplary polypropylene glycols include, but are not limited to, dipropylene glycol, tripropylene glycol, and a combination thereof. In some embodiments, a polypropylene glycol has three terminal alcohols. Exemplary polypropylene glycols having three terminal alcohols, known as propoxylated glycerol, include, but are not limited to, Dow PT250 (which is a glyceryl ether polymer containing three terminal hydroxyl groups with a molecular weight of 250) and Dow PT700 (which is a glyceryl ether polymer containing three terminal hydroxyl groups with a molecular weight of 700). In some embodiments, ether polyol comprises a polyethylene or a polypropylene glycol in the molecular weight range of between about 200 and about 10,000 Da. In some embodiments, one or more of the hydroxyl groups present in the ether polyol is modified. For example, in some embodiments, one or more of the hydroxyl groups present in the ether polyol are alkylated and/or esterified. Exemplary modified ether polyols include, but are not limited to, triacetin, n-butyl ether of diethylene glycol, ethyl ether of diethylene glycol, methyl ether of diethylene glycol, acetate of the ethyl ether of dipropylene glycol, and a combination thereof. In some embodiments, the ether polyol is a cyclic carbonate ester (e.g., propylene carbonate). It has been found that the disclosed compositions containing ether polyols are more suitable for formation of higher solids and/or actives content than previously described compositions containing esters.

In some embodiments, the organic solvent is a glycol-based solvent. A glycol is an alcohol that contains two hydroxyl (—OH) groups that are attached to different carbon atoms (e.g., terminal carbon atoms). The simplest glycol is ethylene glycol, although the solvent should not be limited thereto. In some embodiments, the organic solvent is propylene glycol, propane-1,2,3-triol, or a combination thereof.

In some embodiments, the organic solvent is an oil. Exemplary oils include, but are not limited to, mineral oil and/or kerosene.

In some embodiments, the organic solvent is a fatty acid-based solvent. In some embodiments, the fatty acid contains between 3 to about 20 carbon atoms. An example of a fatty acid-based solvent is a dialkyl amide of a fatty acid (e.g., a dimethylamide). Examples of a dimethylamide of a fatty acid include, but are not limited to, a dimethyl amide of a caprylic acid, a dimethyl amide of a C8-C10 fatty acid (Agnique® AMD810 (N,N-dimethyloctanamide, CAS Number 1118-92-9 and N,N-dimethyldecanamide, CAS Number 14433-76-2)), a dimethyl amide of a natural lactic acid (Agnique® AMD3L (N,N-dimethylactamide; CAS Number 35123-06-9)), and a combination thereof.

In some embodiments, the organic solvent is a ketone-containing solvent. Examples of ketone-containing solvents include, but are not limited to, isophorone, trimethylcyclohexanone, and a combination thereof.

In some embodiments, the organic solvent present is an acetate-containing solvent. Examples of acetate-containing solvents include, but are not limited to, acetate, hexyl acetate, heptyl acetate, and a combination thereof.

In some embodiments, the organic solvent is an amide-containing solvent. Examples of amide-containing solvents include, but are not limited to, Rhodiasolv® ADMA10 (CAS No. 14433-76-2; N,N-dimethyloctanamide), Rhodiasolv® AMD810 (CAS No. 1118-92-9/14433-76-2; blend of N,N-dimethyloctanamide and N,N-dimethyldecanamide), Rhodiasolv® Polarclean (CAS No. 1174627-68-9; methyl 5-(dimethylamino)-2-methyl-5-oxopentanoate), and a combination thereof.

In some embodiments, the organic solvent is a halogenated solvent. In some embodiments, the halogenated solvent is a halogenated aromatic hydrocarbon. An example of a halogenated aromatic hydrocarbon is chlorobenzene. In some embodiments, the halogenated solvent is a halogenated aliphatic hydrocarbon. An example of a halogenated aliphatic hydrocarbon is 1,1,1-trichloroethane.

In some embodiments, the organic solvent is an aromatic solvent. In some embodiments, the aromatic solvent is an aromatic hydrocarbon. Exemplary aromatic hydrocarbons include, but are not limited to, benzene, naphthalene, and a combination thereof. In some embodiments, the aromatic hydrocarbon is substituted. Examples of substituted aromatic hydrocarbons include, but are not limited to, alkyl substituted benzenes and/or alkyl substituted naphthalenes. Examples of alkyl substituted benzenes include xylene, cumene, toluene, propylbenzene, 2-methylnaphthalene, 1-methylnaphthalene and a combination thereof. In some embodiments, the organic solvent comprises xylene. In some embodiments, the aromatic hydrocarbon is a mixture of substituted and unsubstituted aromatic hydrocarbons, such as, but not limited to, a mixture of naphthenic and alkyl substituted naphthalene.

In some embodiments, the aromatic solvent is a mixture of hydrocarbons. For example, in some embodiments, the aromatic solvent is aromatic 100, a solvent containing naphtha (CAS No. 64742-95-6), which is a combination of hydrocarbons obtained from distillation of aromatic streams consisting predominantly of aromatic hydrocarbons C8 through C10, or aromatic 200, a solvent containing a mixture of: aromatic hydrocarbon (C11-C14) present in 50-85% by weight; naphthlene (CAS No. 91-20-3) present in 5-20% by weight; aromatic hydrocarbon (C10) not including naphthalene present in 5-15% by weight, and aromatic hydrocarbon (C15-C16) present in 5-15% by weight based on the total weight of the aromatic 200 composition. In some embodiments, the aromatic hydrocarbon is a mixture of aromatic 100 and aromatic 200.

In some embodiments, the aromatic solvent is heavy aromatic solvent naphtha (petroleum) (CAS Reg. No. 64742-94-5), which is a complex combination of hydrocarbons obtained from distillation of aromatic streams consisting predominantly of aromatic hydrocarbons having carbon numbers predominantly in the range of $C_9$ through $C_{16}$ and boiling in the range of approximately 165° C. to 290° C. (330° F. to 554° F.).

In some embodiments, an organic solvent can be, but is not limited to, an aromatic solvent (such as, but not limited to, alkyl substituted benzene, xylene, propyl benzene, mixed naphthalene and alkyl naphthalene); and mineral oils; kerosene; dialkyl amides of fatty acids, (including, but not limited to, dimethylamides of fatty acids, dimethylamide of caprylic acid); chlorinated aliphatic and aromatic hydrocarbons (including, but not limited to, 1,1,1-trichloroethane, chlorobenzene); esters of glycol derivatives (e.g., n-butyl, ethyl, or methyl ether of diethyleneglycol and acetate of the methyl ether of dipropylene glycol); ketone-containing solvents (e.g., including, but not limited to, isophorone and trimethylcyclohexanone (dihydroisophorone)); and acetate-containing solvents (including, but not limited to, hexyl and heptyl acetate).

In some embodiments, an organic solvent can be, but is not limited to, a heavy aromatic solvent naphtha (petroleum), aromatic 100, aromatic 200, alkylated benzene, a sulfone, a sulfoxide, xylene, cumene, glycol-based solvent (e.g., propylene glycol), a ether polyol and/or polyglycol (e.g., dipropylene glycol, Dow PT250, Dow PT700, PT250, triethylene glycol, tripropylene glycol, propane-1,2,3-triol, polyethylene glycol 3350, propylene carbonate, triacetin), dialkylamides of saturated monocarboxylic fatty acids containing between 3 and 20 carbon atoms (such as Agnique® AMD810, Agnique® AMD3L), amide-containing solvent (e.g., Rhodiasolv® ADMA10, Rhodiasolv, Rhodiasolv® PolarClean and ADMA810), dialkylamides of alpha-hydroxycarboxylic acids containing between 2 and 10 carbon atoms, such as Agnique® AMD3L, Rhodiasolv® PolarClean, or mixtures thereof.

In some embodiments, an organic solvent can be, but is not limited to, aromatic 100 (CAS No. 64742-95-6), aromatic 200 (CAS No. 64742-94-5), a sulfone, glycol-based solvent, a ether polyol (e.g., dipropylene glycol, Dow PT250, Dow PT700, PT250, triethylene glycol, tripropylene glycol, propylene carbonate, triacetin), dialkylamides of saturated monocarboxylic fatty acids containing between 3 and 20 carbon atoms (such as Agnique® AMD810, Agnique® AMD3L), amide-containing solvent (e.g., Rhodiasolv® ADMA10, Rhodiasolv® Polarclean and Rhodiasolv® ADMA810), or mixtures thereof.

In some embodiments, the organic solvent is selected from a heavy aromatic solvent naphtha (petroleum), aromatic 100, aromatic 200, alkylated benzene, alkyl substituted benzene and/or naphthalene, halogenated aromatic solvents, glycol-based solvents, and a combination thereof.

In some embodiments, the organic solvent is relatively free of water. In some embodiments, the organic solvent contains less than about 10% w/w, about 9% w/w, about 8% w/w, about 7% w/w, about 6% w/w, about 5% w/w, about 4% w/w, about 3% w/w, about 2% w/w, about 1% w/w, about 0.9% w/w, about 0.8% w/w, about 0.7% w/w, about 0.6% w/w, about 0.5% w/w, about 0.4% w/w, about 0.3% w/w, or less than about 0.1% w/w of water based on the total weight of the solvent.

In some embodiments, the biostimulant composition can be formulated with at least two or more different solvent types. In some embodiments, the biostimulant composition can be formulated in at least two different solvent types that can exhibit high solvation, lack of volatility, and suitable environmental and toxicological profiles. In some embodiments, the at least two different solvent types to solvate nitrapyrin and/or complexes thereof can be selected from at least two different aromatic solvents, at least two different sulfones, at least two different amide-containing solvents, at least two different ether polyols, at least two different sulfoxides, at least two different amide-containing solvents, at least two different fatty acid-based solvents, or at least two different polar aprotic solvents.

In some embodiments, the at least two different solvent types for solvating nitrapyrin are xylene and dimethylsulfoxide. In some embodiments, the xylene is further mixed with ethylbenzene. In some embodiments, the at least two different solvent types for solvating nitrapyrin are dimethyl sulfoxide and Rhodiasolv® Polarclean. In some embodiments, the at least two different solvent types for solvating nitrapyrin are dimethyl sulfoxide and propane-1,2,3-triol. In some embodiments, the at least two different solvent types for solvating nitrapyrin are dimethyl sulfoxide and acetonitrile.

In some embodiments, the at least two different solvent types for solvating nitrapyrin are organic solvents selected from 1,2,4 trimethylbenzene, xylene, 1,3,5 trimethylbenzene, cumene, 2-methylnaphthalene, naphthalene, 1-methylnaphthalene, heavy aromatic solvent naphtha (petroleum), dimethylsulfoxide, acetonitrile, and a combination thereof. In some embodiments, the at least two different organic solvents are a mixture of 1,2,4 trimethylbenzene (CAS No. 95-63-6), xylene (CAS No. 1330-20-7), 1,3,5 trimethylbenzene (CAS No. 108-67-8), cumene (CAS No. 98-82-8), and acetonitrile. In some embodiments, the at least two different organic solvents are a mixture of 1,2,4 trimethylbenzene (CAS No. 95-63-6), xylene (CAS No. 1330-20-7), 1,3,5 trimethylbenzene (CAS No. 108-67-8), cumene (CAS No. 98-82-8), and dimethylsulfoxide.

In some embodiments, the at least two different organic solvents are a mixture of solvents selected from 2-methylnaphthalene (CAS No. 91-57-6), naphthalene (CAS No. 91-20-3), 1-methylnaphthalene (CAS No. 90-12-0), heavy aromatic solvent naphtha (petroleum) (CAS No. 64742-94-5), dimethylsulfoxide, acetonitrile, and a combination thereof. In some embodiments, the at least two different organic solvents are a mixture of 2-methylnaphthalene (CAS No. 91-57-6), naphthalene (CAS No. 91-20-3), 1-methylnaphthalene (CAS No. 90-12-0), heavy aromatic solvent naphtha (petroleum)(CAS No. 64742-94-5), and dimethylsulfoxide. In some embodiments, the at least two different organic solvents are a mixture of 2-methylnaphthalene (CAS No. 91-57-6), naphthalene (CAS No. 91-20-3), 1-methylnaphthalene (CAS No. 90-12-0), heavy aromatic solvent naphtha (petroleum) (CAS No. 64742-94-5), and acetonitrile.

The amount of each solvent type present in the biostimulant composition can vary. In some embodiments, the first solvent of the at least two or more different solvent types is present in an amount ranging from about 10% to about 90%, from about 20% to about 80%, from about 30% to about 70%, from about 40% to about 60% w/w based on the total weight of the composition. In some embodiments, the second solvent of the at least two or more different solvent type is present in an amount ranging from about 10% to about 90%, from about 20% to about 80%, from about 30% to about 70%, from about 40% to about 60% w/w based on the total weight of the composition. In some embodiments, the first solvent is dimethylsulfoxide (DMSO). In some embodiments, the second solvent is xylene, acetonitrile or Rhodiasolv® Polarclean. In some embodiments, the first solvent is present in an amount of about 50% w/w based on the total weight of the composition.

In some embodiments, solvency of the nitrapyrin (or formulations comprising nitrapyrin) in solution/solvent at 20° C. is greater than 15% w/w (nitrapyrin to total weight), for example, from about 15% to about 22% w/w, or about 17% to about 21% w/w, or greater than 16% w/w, greater than 17% w/w, greater than 18% w/w, greater than 19% w/w, greater than 20% w/w, greater than 21% w/w, greater than 22% w/w, greater than 23% w/w, greater than 24% w/w, or greater than 25% w/w greater than 26% w/w, greater than 27% w/w, greater than 28% w/w, greater than 29% w/w, greater than 30% w/w, greater than 35% w/w, greater than 40% w/w, or greater than 45% w/w.

In some embodiments, the amount of the first solvent and the amount of the second solvent are present in a weight ratio of from about 100:1 to about 1:100, from about 75:1 to about 1:75, from about 50:1 to about 1:50, from about 25:1 to about 1:25, from about 20:1 to about 1:20, from about 15:1 to about 1:15, from about 10:1 to about 1:10, from about 5:1 to about 1:5, from about 4:1 to about 1:4, from about 3:1 to about 1:3, from about 2:1 to about 1:2, or about 1:1.

In some embodiments, solvency of the nitrapyrin in solution/solvent at 20° C. is greater than 15% w/w (nitrapyrin to total weight), for example, from about 15% w/w to about 22% w/w, or about 17% to about 21% w/w, or greater than 16% w/w, greater than 17% w/w, greater than 18% w/w, greater than 19% w/w, greater than 20% w/w, greater than 21% w/w, greater than 22% w/w, greater than 23% w/w, greater than 24% w/w, or greater than 25% w/w greater than 26% w/w, greater than 27% w/w, greater than 28% w/w, greater than 29% w/w, greater than 30% w/w, greater than 35% w/w, greater than 40% w/w, or greater than 45% w/w.

The solvent can be present in the biostimulant composition at an amount from 0.1% w/v to about 99.9% w/v. In some embodiments, the amount of solvent will be minimized as the amount of nitrapyrin and/or nitrapyrin complex is maximized. In some embodiments, the amount of solvent is less than 80% w/v, less than 79% w/v, less than 78% w/v, less than 77% w/v, less than 76% w/v, less than 75% w/v, less than 74% w/v, less than 73% w/v, less than 72% w/v, less than 71% w/v, less than 70% w/v, less than 65% w/v, less than 60% w/v, or less than 55% w/v. In some embodiments, the amount of solvent is from 55% w/v to about 98% w/v; or from about 60% w/v to about 97% w/v; or from about 61% w/v to about 95% w/v; or from about 62% w/v to about 90% w/v; or from about 63% w/v to about 85% w/v; or from about 64% w/v to about 80% w/v. In some embodiments, the amount of solvent is from about 10% w/v to about 90% w/v, from about 20% w/v to about 80% w/v, from about 50% w/v to about 70% w/v, or from about 60% w/v to about 70% w/v. In some embodiments, the amount of solvent is from about 10% w/v to about 50% w/v, or from about 10% w/v to about 40% w/v, or from about 10% w/v to about 30% w/v, or from about 10% w/v to about 20% w/v.

In some embodiments, the composition comprises nitrapyrin complexed with a polyanionic species. Advantageously, nitrapyrin complexes with polyanions have been found to provide excellent loading heretofore not disclosed. Advantages of the highly concentrated biostimulant composition include lower cost of shipping and ease of handling. In some embodiments, the biostimulant composition comprises nitrapyrin in a range from about 20% to about 50% by wt. based on the total weight of the composition. In some embodiments, the biostimulant composition comprises nitrapyrin in a range from about 21% to about 49% by wt. based on the total weight of the composition. In some embodiments, the biostimulant composition comprises nitrapyrin in a range from about 22% to about 48% by wt. based on the total weight of the composition. In some embodiments, the biostimulant composition comprises nitrapyrin in a range from about 23% to about 47% by wt. based on the total weight of the composition. In some embodiments, the biostimulant composition comprises nitrapyrin in a range from about 24% to about 46% by wt. based on the total weight of the composition. In some embodiments, the biostimulant composition comprises nitrapyrin in a range from about 25% to about 45% by wt. based on the total weight of the composition. In some embodiments, the biostimulant composition comprises nitrapyrin in a range from about 26% to about 40% by wt. based on the total weight of the composition. In some embodiments, the biostimulant composition comprises nitrapyrin in a range from about 27% to about 35% by wt. based on the total weight of the composition. In some embodiments, the biostimulant composition comprises nitrapyrin in a range from about 28% to about 32% by wt. based on the total weight of the composition. In some embodiments, the biostimulant composition comprises nitrapyrin in an amount of about 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50% by wt. based on the total weight of the composition.

In some embodiments, biostimulant compositions containing nitrapyrin complexes are disclosed. The nitrapyrin complexes are more readily dissolved in appropriate solvents when compared to nitrapyrin alone or with prior art formulations. The described nitrapyrin complexes can form solutions that are greater than or equal to 25% nitrapyrin by weight. Suitable solvents include, but are not limited to, aprotic organic solvents, aromatic 100 (CAS No. 64742-95-6), aromatic 200 (CAS No. 64742-94-5), sulfones (e.g., dimethylsulfoxide (DMSO)), amide-containing solvents (e.g., Rhodiasolv® Polarclean), aromatic solvents (e.g., xylenes) and glycols. In some embodiments, the organic solvent is DMSO and xylene. In some embodiments, the solvent is DMSO and Rhodiasolv® Polarclean. In some embodiments, the solvent is Rhodiasolv® Polarclean. In some embodiments, the solvent is DMSO and acetonitrile.

In some embodiments, nitrapyrin complexed with a polyanion and compositions comprising the nitrapyrin complexes reduce volatility of the nitrapyrin by about 5% to about 40% relative to untreated nitrapyrin. In some embodiments, nitrapyrin complexed with a polyanion and compositions comprising the nitrapyrin complexes reduce volatility of the nitrapyrin by about 8% to about 35% relative to untreated nitrapyrin. In some embodiments, nitrapyrin complexed with a polyanion and compositions comprising the nitrapyrin complexes reduce volatility of the nitrapyrin by about 10% to about 30% relative to untreated nitrapyrin. In some embodiments, nitrapyrin complexed with a polyanion and compositions comprising the nitrapyrin complexes reduce volatility of the nitrapyrin by about 5, 6, 7, 8, 9, 10, 11, 12, 13, 14, 15, 16, 17, 18, 19, 20, 21, 22, 23, 24, 25, 26, 27, 28, or 29%.

In some embodiments, the composition comprises the following solvent-nitrapyrin-polyanion combinations: one or more of malic acid, tartaric acid, etidronic acid, succinic acid, adipic acid, sebacic acid, isophthalic acid, maleic-acrylic copolymer, BC and/or T5, and one or more of dipropylene glycol, PT700, PT250, triethylene glycol, tripropylene glycol, propylene carbonate, triacetin, Agnique® AMD810, Agnique® AMD3L, Rhodiasolv® ADMA10, Rhodiasolv® ADMA810 and/or Rhodiasolv® Polarclean.

B. Other Ingredients

In some embodiments, the biostimulant composition can be formulated into a formulation comprising an organic solvent and/or one or more additional ingredients. Exemplary additional ingredients include one or more auxiliaries selected from extenders, carriers, solvents, surfactants (surface-active agents), stabilizers, antifoaming agents, antifreezing agents, preservatives, antioxidants, viscosity modifiers, suspending agents, light absorbers, corrosion inhibitors, fragrances, pH-modifying substances, glidants, lubricants, plasticizers, complexing agents, colorants, thickeners, solid adherents, fillers, wetting agents, dispersing agents, lubricants, anticaking agents, deformers, and diluents, such as, but not limited to, a surface active agent, an antifoam agent, a dispersant, or a combination thereof.

In some embodiments, the one or more auxiliaries is a surface-active agent (e.g., a surfactant). In some embodiments, the surface-active agent is selected from polyoxyethylene tridecyl ether phosphate (Rhodafac RS-610), propylene oxide ethylene oxide polymer monobutyl ether (Antarox B848), a mixture of castor oil, ethoxylated, oleate (Alkamuls VO/2003), 4-dodecylbenzenesulfonic acid and salts thereof (e.g., dodecylbenzenesulfonate, sodium salt, etc.), and a combination thereof. The amount of surface-active agent in the formulation can vary. In some embodiments, the amount of surface-active agent in the composition and/or formulation is from about 0.1% to about 20%, from about 0.1% to about 10%, from about 1% to about 10%, from about 3% to about 8%, from about 5% to about 8% or from about 10% to about 20%, from about 12% to about 18% or from about 14% to about 16% by weight based on the total weight of the composition and/or formulation.

In some embodiments, the one or more auxiliaries is an antifoam agent. In some embodiments, the antifoam agent is selected from an oil-based antifoam agent, a powder-based antifoam agent, a water-based antifoam agent, a silicone-based antifoam agent, and EO/PO-based antifoam agent, an alkyl polyacrylate-based foam agent, and a combination thereof. Exemplary oil-based antifoam agents include, but are not limited to, mineral oil, vegetable oil, white oil, a wax, or hydrophobic silica. Exemplary waxes include, but are not limited to, ethylene bis stearamide (EBS), paraffin waxes, ester waxes, hydrocarbon waxes, fatty alcohol waxes, and a combination thereof. Exemplary powder-based antifoam agents include, but are not limited to, oil-based antifoam agents on a particulate carrier like silica. Exemplary silicone-based antifoam agents include, but are not limited to, polymers with a silicon backbone, silicon compounds comprising a hydrophobic silica dispersant in a silicone oil, or silicone-treated silica. Exemplary EO/PO-based antifoaming agents include, but are not limited to, polyethylene glycol and polypropylene glycol copolymers. The amount of antifoam agent in the formulation can vary. In some embodiments, the amount of antifoam agent in the composition and/or formulation is from 0.1% to about 20%, from about 0.1% to about 10%, from about 1% to about 10%, from about 3% to about 8%, from about 5% to about 8% or from about 10% to about 20%, from about 12% to about 18% or from about 14% to about 16% by weight based on the total weight of the composition and/or formulation.

In some embodiments, the one or more auxiliaries is a dispersant. In some embodiments, the dispersant is selected from soap powder, turkey red oil, alkyl sulphonates, alkyl acryl sulphonates, formaldehyde, lignin sulphonates, and a combination thereof. The amount of antifoam agent in the formulation can vary. In some embodiments, the amount of antifoam agent in the formulation is from 0.1% to about 20%, from about 0.1% to about 10%, from about 1% to about 10%, from about 3% to about 8%, from about 5% to about 8% or from about 10% to about 20%, from about 12% to about 18% or from about 14% to about 16% by weight based on the total weight of the formulation and/or composition.

Further, a skilled person in the art would also be aware of the type and combination of additional ingredients/auxiliaries that would be required to optimize the biostimulant formulation based on the just listed properties and additional properties apparent to a skilled person in the art.

The biostimulant formulation can be in the form of a liquid or a solid. Examples of liquid and solid biostimulant formulations include, but are not limited to, soluble liquids (SF), emulsifiable concentrates (EC), wettable powders (WP), dry flowable (DF), flowables (F), water soluble powders (SP), ultra-low-volume concentrate (ULV), suspension concentrates (SC), aqueous suspensions (AS), microencapsulated suspension (ME or MT), capsule suspension (CS), granules (G), or pellets (P). In some embodiments, the biostimulant composition is in the form of a soluble salt, which is water soluble and requires little to no agitation to stay in solution. These types of formulations are often referred to as solutions (S), soluble concentrates (SC), liquid (L), and water-soluble concentrates (WSC). In some embodiments, these types of formulations (e.g., S) are "ready-to-use." In some embodiments, the formulation is a tank mix formulation or a premix formulation. In some embodiments, these types of formulations (e.g., SC, WSC) are diluted with water prior to use. In some embodiments, the biostimulant composition disclosed herein is in the form of a granule (G).

IV. Agricultural Compositions

Any of the described biostimulant compositions and formulations thereof comprising nitrapyrin can be combined with one or more biological products to render an agricultural composition. Agricultural products can be selected from the group consisting of fertilizer, biologically active compounds, treated/coated seeds, compounds having urease inhibition activity, nitrification inhibition activity, pesticides, herbicides, insecticides, fungicides, miticides, other biostimulant agents and the like. In some embodiments, the agricultural composition can include an organic solvent such as the ones already discussed above.

In some embodiments, the described biostimulant composition may be mixed with the fertilizer products, applied as a surface coating to the fertilizer products, or otherwise thoroughly mixed with the fertilizer products. In some embodiments, in such combined fertilizer/biostimulant composition, the fertilizer is in the form of particles having an average diameter of from about powder size (less than about 0.001 cm) to about 10 mm, more preferably from about 0.1 mm to about 5 mm, and still more preferably from about 0.15 mm to about 3 mm. The amount of biostimulant composition and fertilizer product in such combined fertilizer/biostimulant compositions can vary. For example, in some embodiments, the biostimulant composition and fertilizer product are present at a weight ratio of from about 1:1,000 to about 1,000:1, from about 1:100 to about 100:1, from about 1:500 to about 500:1, from about 1:250 to about 250:1, from about 1:100 for about 100:1, from about 1:75 to about 75:1, from about 1:50 to about 50:1, from about 1:25 to about 25:1, from about 1:10 to about 10:1, from about 1:5 to about 5:1, from about 1:3 to about 3:1, or from about 1:2 to about 2:1. In some embodiments, the amount of biostimulant composition and fertilizer product in the combined fertilizer/biostimulant composition is present at a weight ratio of from about 1:1,000, from about 1:750, from about 1:600, from about 1:500, from about 1:450, from about 1:430, from about 1:400, from about 1:350, from about 1:300, from about 1:250, from about 1:200, from about 1:150, or from about 1:100 biostimulant composition:fertilizer product. In some embodiments, the amount of biostimulant composition and fertilizer product are present at a weight ratio from about 1:1,000 to about 1:500, from about 1:500 to about 1:250, from about 1:450 to about 1:250, from about 1:430 to about 1:250, or from about 1:300 to about 1:100 biostimulant composition:fertilizer composition.

In the case of the combined fertilizer/biostimulant composition products, the combined product can be applied at a level so that the amount of nitrapyrin applied is about 0.1-150 g per acre, 1-90 g per acre of soil, about 5-70 g per acre, or about 10-50 g per acre of soil.

The combined products can likewise be applied as liquid dispersions or as dry granulated products, at the discretion of the user. When the biostimulant composition is used as a coating, the biostimulant composition can comprise between about 0.005% and about 15% by weight of the coated fertilizer product, about 0.01% and about 10% by weight of the coated fertilizer product, about 0.05% and about 2% by weight of the coated fertilizer product or about 0.5% and about 1% by weight of the coated fertilizer product.

A. Fertilizers

In some embodiments, the agricultural product is a fertilizer. The fertilizer can be a solid fertilizer, such as, but not limited to, a granular fertilizer, and the biostimulant composition can be applied to the fertilizer as a liquid dispersion. The fertilizer can be in liquid form, and the biostimulant composition can be mixed with the liquid fertilizer. The fertilizers can be selected from the group consisting of starter fertilizers, phosphate-based fertilizers, fertilizers containing nitrogen, fertilizers containing phosphorus, fertilizers containing potassium, fertilizers containing calcium, fertilizers containing magnesium, fertilizers containing boron, fertilizers containing chlorine, fertilizers containing zinc, fertilizers containing manganese, fertilizers containing copper, fertilizers containing urea and ammonium nitrite and/or fertilizers containing molybdenum materials. In some embodiments, the fertilizer is an NPK fertilizer containing nitrogen, phosphorus and potassium (e.g., NPK 6-24-6 and/or NPK 15-5-15). In some embodiments, the fertilizer is or contains urea, and/or ammonia, including anhydrous ammonia fertilizer. In some embodiments, the fertilizer comprises plant-available nitrogen, phosphorous, potassium, sulfur, calcium, magnesium or micronutrients. In some embodiments, the fertilizer is solid, granular, a fluid suspension, a gas, or a solutionized fertilizer. In some embodiments, the fertilizer comprises a micronutrient. A micronutrient is an essential element required by a plant in small quantities. In some embodiments, the fertilizer comprises a metal ion selected from the group consisting of: Fe, Mn, Mg, Zn, Cu, Ni, Co, Mo, V and Ca. In some embodiments, the fertilizer comprises gypsum, Kieserite Group member, potassium product, potassium magnesium sulfate, elemental sulfur, or potassium magnesium sulfate. Such fertilizers may be granular, liquid, gaseous, or mixtures (e.g., suspensions of solid fertilizer particles in liquid material).

In some embodiments, the biostimulant composition is combined with any suitable liquid or dry fertilizer for application to fields and/or crops.

The described biostimulant composition, or formulations thereof, can be applied with the application of a fertilizer. The biostimulant composition can be applied prior to, subsequent to, or simultaneously with the application of fertilizers.

Biostimulant-containing fertilizer compositions can be applied in any manner which will benefit the crop of interest. In some embodiments, a fertilizer composition is applied to growth mediums in a band or row application. In some embodiments, the compositions are applied to or throughout the growth medium prior to seeding or transplanting the desired crop plant. In some embodiments, the compositions can be applied to the root zone of growing plants. In some embodiments, the compositions can be applied directly adjacent to the growing plants. In some embodiments, the compositions can be applied to one or more parts of the plant (e.g., foliar application methods). In some embodiments, the biostimulant composition is applied in a different manner than the fertilizer composition. In some embodiments, the biostimulant composition is applied in the same manner as the fertilizer composition.

B. Seed

In some embodiments are described agricultural seeds coated with one or more of the described biostimulant compositions. The biostimulant composition can be present in the seed product at a level of from about 0.001% to about 10%, about 0.004% to about 2%, about 0.01% to about 1%, or from about 0.1% to about 1% by weight (or no more than about 10%, about 9%, about 8%, about 7% about 6%, about 5%, about 4%, about 3%, about 2%, about 1%, about 0.5%, about 0.1%, about 0.01% or no more than 0.001%), based upon the total weight of the coated seed product. A seed can be, but is not limited to, wheat, barley, oat, triticale, rye, rice, maize, soybean, cotton, or oilseed rape.

C. Other

In some embodiments are described urease-inhibiting compounds, nitrification-inhibiting compounds, pesticides, and/or other biostimulant agents in combination with one or more of the described biostimulant composition. As used herein, "pesticide" refers to any agent with pesticidal activity (e.g., herbicides, insecticides, fungicides, and/or miticides) and is preferably selected from the group consisting of insecticides, herbicides, and mixtures thereof, but normally excluding materials which assertedly have a plant-fertilizing effect, for example, sodium borate and zinc compounds such as zinc oxide, zinc sulfate, and zinc chloride. For an unlimited list of pesticides, see "Farm Chemicals Handbook 2000, 2004" (Meister Publishing Co, Willoughby, OH), which is hereby incorporated by reference in its entirety.

Exemplary herbicides include, but are not limited to, acetochlor, alachlor, aminopyralid, atrazine, benoxacor, bromoxynil, carfentrazone, chlorsulfuron, clodinafop, clopyralid, dicamba, diclofop-methyl, dimethenamid, fenoxaprop, flucarbazone, flufenacet, flumetsulam, flumiclorac, fluroxypyr, glufosinate-ammonium, glyphosate, halosulfuron-methyl, imazamethabenz, imazamox, imazapyr, imazaquin, imazethapyr, isoxaflutole, quinclorac, MCPA, MCP amine, MCP ester, mefenoxam, mesotrione, metolachlor, s-metolachlor, metribuzin, metsulfuron methyl, nicosulfuron, paraquat, pendimethalin, picloram, primisulfuron, propoxycarbazone, prosulfuron, pyraflufen ethyl, rimsulfuron, simazine, sulfosulfuron, thifensulfuron, topramezone, tralkoxydim, triallate, triasulfuron, tribenuron, triclopyr, trifluralin, 2,4-D, 2,4-D amine, 2,4-D ester and the like.

Exemplary insecticides include, but are not limited to, 1,2 dichloropropane, 1,3 dichloropropene, abamectin, acephate, acequinocyl, acetamiprid, acethion, acetoprole, acrinathrin, acrylonitrile, alanycarb, aldicarb, aldoxycarb, aldrin, allethrin, allosamidin, allyxycarb, alpha cypermethrin, alpha ecdysone, amidithion, amidoflumet, aminocarb, amiton, amitraz, anabasine, arsenous oxide, athidathion, azadirachtin, azamethiphos, azinphos ethyl, azinphos methyl, azobenzene, azocyclotin, azothoate, barium hexafluorosilicate, barthrin, benclothiaz, bendiocarb, benfuracarb, benoxafos, bensultap, benzoximate, benzyl benzoate, beta cyfluthrin, beta cypermethrin, bifenazate, bifenthrin, binapacryl, bioallethrin, bioethanomethrin, biopermethrin, bistrifluron, borax, boric acid, bromfenvinfos, bromo DDT, bromocyclen, bromophos, bromophos ethyl, bromopropylate, bufencarb, buprofezin, butacarb, butathiofos, butocarboxim, butonate, butoxycarboxim, cadusafos, calcium arsenate, calcium polysulfide, camphechlor, carbanolate, carbaryl, carbofuran, carbon disulfide, carbon tetrachloride, carbophenothion, carbosulfan, cartap, chinomethionat, chlorantraniliprole, chlorbenside, chlorbicyclen, chlordane, chlordecone, chlordimeform, chlorethoxyfos, chlorfenapyr, chlorfenethol, chlorfenson, chlorfensulphide, chlorfenvinphos, chlorfluazuron, chlormephos, chlorobenzilate, chloroform, chloromebuform, chloromethiuron, chloropicrin, chloropropylate, chlorphoxim, chlorprazophos, chlorpyrifos, chlorpyrifos methyl, chlorthiophos, chromafenozide, cinerin I, cinerin II, cismethrin, cloethocarb, clofentezine, closantel, clothianidin, copper acetoarsenite, copper arsenate, copper naphthenate, copper oleate, coumaphos, coumithoate, crotamiton, crotoxyphos, cruentaren A & B, crufomate, cryolite, cyanofenphos, cyanophos, cyanthoate, cyclethrin, cycloprothrin, cyenopyrafen, cyflumetofen, cyfluthrin, cyhalothrin, cyhexatin, cypermethrin, cyphenothrin, cyromazine, cythioate, d-limonene, dazomet, DBCP, DCIP, DDT, decarbofuran, deltamethrin, demephion, demephion-O, demephion-S, demeton, demeton methyl, demeton-O, demeton-O-methyl, demeton-S, demeton-S-methyl, demeton-S-methylsulphon, diafenthiuron, dialifos, diamidafos, diazinon, dicapthon, dichlofenthion, dichlofluanid, dichlorvos, dicofol, dicresyl, dicrotophos, dicyclanil, dieldrin, dienochlor, diflovidazin, diflubenzuron, dilor, dimefluthrin, dimefox, dimetan, dimethoate, dimethrin, dimethylvinphos, dimetilan, dinex, dinobuton, dinocap, dinocap-4, dinocap-6, dinocton, dinopenton, dinoprop, dinosam, dinosulfon, dinotefuran, dinoterbon, diofenolan, dioxabenzofos, dioxacarb, dioxathion, diphenyl sulfone, disulfiram, disulfoton, dithicrofos, DNOC, dofenapyn, doramectin, ecdysterone, emamectin, EMPC, empenthrin, endosulfan, endothion, endrin, EPN, epofenonane, eprinomectin, esfenvalerate, etaphos, ethiofencarb, ethion, ethiprole, ethoate methyl, ethoprophos, ethyl DDD, ethyl formate, ethylene dibromide, ethylene dichloride, ethylene oxide, etofenprox, etoxazole, etrimfos, EXD, famphur, fenamiphos, fenazaflor, fenazaquin, fenbutatin oxide, fenchlorphos, fenethacarb, fenfluthrin, fenitrothion, fenobucarb, fenothiocarb, fenoxacrim, fenoxycarb, fenpirithrin, fenpropathrin, fenpyroximate, fenson, fensulfothion, fenthion, fenthion ethyl, fentrifanil, fenvalerate, fipronil, flonicamid, fluacrypyrim, fluazuron, flubendiamide, flubenzimine, flucofuron, flucycloxuron, flucythrinate, fluenetil, flufenerim, flufenoxuron, flufenprox, flumethrin, fluorbenside, fluvalinate, fonofos, formetanate, formothion, formparanate, fosmethilan, fospirate, fosthiazate, fosthietan, fosthietan, furathiocarb, furethrin, furfural, gamma cyhalothrin, gamma HCH, halfenprox, halofenozide, HCH, HEOD, heptachlor, heptenophos, heterophos, hexaflumuron, hexythiazox, HHDN, hydramethylnon, hydrogen cyanide, hydroprene, hyquincarb, imicyafos, imidacloprid, imiprothrin, indoxacarb, iodomethane, IPSP, isamidofos, isazofos, isobenzan, isocarbophos, isodrin, isofenphos, isoprocarb, isoprothiolane, isothioate, isoxathion, ivermectin jasmolin I, jasmolin II, jodfenphos, juvenile hormone I, juvenile hormone II, juvenile hormone III, kelevan, kinoprene, lambda cyhalothrin, lead arsenate, lepimectin, leptophos, lindane, lirimfos, lufenuron, lythidathion, malathion, malonoben, mazidox, mecarbam, mecarphon, menazon, mephosfolan, mercurous chloride, mesulfen, mesulfenfos, metaflumizone, metam, methacrifos, methamidophos, methidathion, methiocarb, methocrotophos, methomyl, methoprene, methoxychlor, methoxyfenozide, methyl bromide, methyl isothiocyanate, methylchloroform, methylene chloride, metofluthrin, metolcarb, metoxadiazone, mevinphos, mexacarbate, milbemectin, milbemycin oxime, mipafox, mirex, MNAF, monocrotophos, morphothion, moxidectin, naftalofos, naled, naphthalene, nicotine, nifluridide, nikkomycins, nitenpyram, nithiazine, nitrilacarb, novaluron, noviflumuron, omethoate, oxamyl, oxydemeton methyl, oxydeprofos, oxydisulfoton, paradichlorobenzene, parathion, parathion methyl, penfluron, pentachlorophenol, permethrin, phenkapton, phenothrin, phenthoate, phorate, phosalone, phosfolan, phosmet, phosnichlor, phosphamidon, phosphine, phosphocarb, phoxim, phoxim methyl, pirimetaphos, pirimicarb, pirimiphos ethyl, pirimiphos methyl, potassium arsenite, potassium thiocyanate, pp' DDT, prallethrin, precocene I, precocene II, precocene III, primidophos, proclonol, profenofos, profluthrin, promacyl, promecarb, propaphos, propargite, propetamphos, propoxur, prothidathion, prothiofos, prothoate, protrifenbute, pyraclofos, pyrafluprole, pyrazophos, pyresmethrin, pyrethrin I, pyrethrin II, pyridaben, pyridalyl, pyridaphenthion, pyrifluquinazon, pyrimidifen, pyrimitate, pyriprole, pyriproxyfen, quassia, quinalphos, quinalphos, quinalphos methyl, quinothion, quantifies, rafoxanide, resmethrin, rotenone, ryania, sabadilla, schradan, selamectin, silafluofen, sodium arsenite, sodium fluoride, sodium hexafluorosilicate, sodium thiocyanate, sophamide, spinetoram, spinosad, spirodiclofen, spiromesifen, spirotetramat, sulcofuron, sulfiram, sulfluramid, sulfotep, sulfur, sulfiuyl fluoride, sulprofos, tau fluvalinate, tazimcarb, TDE, tebufenozide, tebufenpyrad, tebupirimfos, teflubenzuron, tefluthrin, temephos, TEPP, terallethrin, terbufos, tetrachloroethane, tetrachlorvinphos, tetradifon, tetramethrin, tetranactin, tetrasul, theta cypermethrin, thiacloprid, thiamethoxam, thicrofos, thiocarboxime, thiocyclam, thiodicarb, thiofanox, thiometon, thionazin, thioquinox, thiosultap, thuringiensin, tolfenpyrad, tralomethrin, transfluthrin, transpermethrin, triarathene, triazamate, triazophos, trichlorfon, trichlormetaphos 3, trichloronat, trifenofos, triflumuron, trimethacarb, triprene, vamidothion, vaniliprole, XMC, xylylcarb, zeta cypermethrin and zolaprofos.

Exemplary fungicides include, but are not limited to, acibenzolar, acylamino acid fungicides, acypetacs, aldimorph, aliphatic nitrogen fungicides, allyl alcohol, amide fungicides, ampropylfos, anilazine, anilide fungicides, antibiotic fungicides, aromatic fungicides, aureofungin, azaconazole, azithiram, azoxystrobin, barium polysulfide, benalaxyl, benalaxyl-M, benodanil, benomyl, benquinox, bentaluron, benthiavalicarb, benzalkonium chloride, benzamacril, benzamide fungicides, benzamorf, benzanilide fungicides, benzimidazole fungicides, benzimidazole precursor fungicides, benzimidazolylcarbamate fungicides, benzohydroxamic acid, benzothiazole fungicides, bethoxazin, binapacryl, biphenyl, bitertanol, bithionol, bixafen, blasticidin-S, Bordeaux mixture, boric acid, boscalid, bridged diphenyl fungicides, bromuconazole, bupirimate, Burgundy mixture, buthiobate, sec-butylamine, calcium polysulfide, captafol, captan, carbamate fungicides, carbamorph, carbanilate fungicides, carbendazim, carboxin, carpropamid, carvone, Cheshunt mixture, chinomethionat, chlobenthiazone, chloraniformethan, chloranil, chlorfenazole, chlorodinitronaphthalene, chloroform, chloroneb, chloropicrin, chlorothalonil, chlorquinox, chlozolinate, ciclopirox, climbazole, clotrimazole, conazole fungicides, conazole fungicides (imidazoles), conazole fungicides (triazoles), copper(II) acetate, copper(II) carbonate, basic, copper fungicides, copper hydroxide, copper naphthenate, copper oleate, copper oxychloride, copper(II) sulfate, copper sulfate, basic, copper zinc chromate, cresol, cufraneb, cuprobam, cuprous oxide, cyazofamid, cyclafuramid, cyclic dithiocarbamate fungicides, cycloheximide, cyflufenamid, cymoxanil, cypendazole, cyproconazole, cyprodinil, dazomet, DBCP, debacarb, decafentin, dehydroacetic acid, dicarboximide fungicides, dichlofluanid, dichlone, dichlorophen, dichlorophenyl, dichlozoline, diclobutrazol, diclocymet, diclomezine, dicloran, diethofencarb, diethyl pyrocarbonate, difenoconazole, diflumetorim, dimethirimol, dimethomorph, dimoxystrobin, diniconazole, diniconazole-M, dinitrophenol fungicides, dinobuton, dinocap, dinocap-4, dinocap-6, dinocton, dinopenton, dinosulfon, dinoterbon, diphenylamine, dipyrithione, disulfiram, ditalimfos, dithianon, dithiocarbamate fungicides, DNOC, dodemorph, dodicin, dodine, donatodine, drazoxolon, edifenphos, epoxiconazole, etaconazole, etem, ethaboxam, ethirimol, ethoxyquin, ethylene oxide, ethylmercury 2,3-dihydroxypropyl mercaptide, ethylmercury acetate, ethylmercury bromide, ethylmercury chloride, ethylmercury phosphate, etridiazole, famoxadone, fenamidone, fenaminosulf, fenapanil, fenarimol, fenbuconazole, fenfuram, fenhexamid, fenitropan, fenoxanil, fenpiclonil, fenpropidin, fenpropimorph, fentin, ferbam, ferimzone, fluazinam, fluconazole, fludioxonil, flumetover, flumorph, fluopicolide, fluoroimide, fluotrimazole, fluoxastrobin, fluquinconazole, flusilazole, flusulfamide, flutolanil, flutriafol, fluxapyroxad, folpet, formaldehyde, fosetyl, fuberidazole, furalaxyl, furametpyr, furamide fungicides, furanilide fungicides, furcarbanil, furconazole, furconazole-cis, furfural, furmecyclox, furophanate, glyodin, griseofulvin, guazatine, halacrinate, hexachlorobenzene, hexachlorobutadiene, hexachlorophene, hexaconazole, hexylthiofos, hydrargaphen, hymexazol, imazalil, imibenconazole, imidazole fungicides, iminoctadine, inorganic fungicides, inorganic mercury fungicides, iodomethane, ipconazole, iprobenfos, iprodione, iprovalicarb, isopropyl alcohol, isoprothiolane, isovaledione, isopyrazam, kasugamycin, ketoconazole, kresoxim-methyl, lime sulfur (lime sulphur), mancopper, mancozeb, maneb, mebenil, mecarbinzid, mepanipyrim, mepronil, mercuric chloride (obsolete), mercuric oxide (obsolete), mercurous chloride (obsolete), metalaxyl, metalaxyl-M (a.k.a. Mefenoxam), metam, metazoxolon, metconazole, methasulfocarb, methfuroxam, methyl bromide, methyl isothiocyanate, methylmercury benzoate, methylmercury dicyandiamide, methylmercury pentachlorophenoxide, metiram, metominostrobin, metrafenone, metsulfovax, milneb, morpholine fungicides, myclobutanil, myclozolin, N-(ethylmercury)-p-toluenesulfonanilide, nabam, natamycin, nystatin, β-nitrostyrene, nitrothal-isopropyl, nuarimol, OCH, octhilinone, ofurace, oprodione, organomercury fungicides, organophosphorus fungicides, organotin fungicides (obsolete), orthophenyl phenol, orysastrobin, oxadixyl, oxathiin fungicides, oxazole fungicides, oxine copper, oxpoconazole, oxycarboxin, pefurazoate, penconazole, pencycuron, pentachlorophenol, penthiopyrad, phenylmercuriurea, phenylmercury acetate, phenylmercury chloride, phenylmercury derivative of pyrocatechol, phenylmercury nitrate, phenylmercury salicylate, phenylsulfamide fungicides, phosdiphen, phosphite, phthalide, phthalimide fungicides, picoxystrobin, piperalin, polycarbamate, polymeric dithiocarbamate fungicides, polyoxins, polyoxorim, polysulfide fungicides, potassium azide, potassium polysulfide, potassium thiocyanate, probenazole, prochloraz, procymidone, propamocarb, propiconazole, propineb, proquinazid, prothiocarb, prothioconazole, pyracarbolid, pyraclostrobin, pyrazole fungicides, pyrazophos, pyridine fungicides, pyridinitril, pyrifenox, pyrimethanil, pyrimidine fungicides, pyroquilon, pyroxychlor, pyroxyfur, pyrrole fungicides, quinacetol, quinazamid, quinconazole, quinoline fungicides, quinomethionate, quinone fungicides, quinoxaline fungicides, quinoxyfen, quintozene, rabenzazole, salicylanilide, silthiofam, silver, simeconazole, sodium azide, sodium bicarbonate[2][3], sodium orthophenylphenoxide, sodium pentachlorophenoxide, sodium polysulfide, spiroxamine, streptomycin, strobilurin fungicides, sulfonanilide fungicides, sulfur, sulfuryl fluoride, sultropen, TCMTB, tebuconazole, tecloftalam, tecnazene, tecoram, tetraconazole, thiabendazole, thiadifluor, thiazole fungicides, thicyofen, thifluzamide, thymol, triforine, thiocarbamate fungicides, thiochlorfenphim, thiomersal, thiophanate, thiophanate-methyl, thiophene fungicides, thioquinox, thiram, tiadinil, tioxymid, tivedo, tolclofos-methyl, tolnaftate, tolylfluanid, tolylmercury acetate, triadimefon, triadimenol, triamiphos, triarimol, triazbutil, triazine fungicides, triazole fungicides, triazoxide, tributyltin oxide, trichlamide, tricyclazole, tridemorph, trifloxystrobin, triflumizole, triforine, triticonazole, unclassified fungicides, undecylenic acid, uniconazole, uniconazole-P, urea fungicides, validamycin, valinamide fungicides, vinclozolin, voriconazole, zarilamid, zinc naphthenate, zineb, ziram, and/or zoxamide.

Exemplary classes of miticides include, but are not limited to, botanical acaricides, bridged diphenyl acaricides, carbamate acaricides, oxime carbamate acaricides, carbazate acaricides, dinitrophenol acaricides, formamidine acaricides, isoxaline acaricides, macrocyclic lactone acaricides, avermectin acaricides, milbemycin acaricides, milbemycin acaricides, mite growth regulators, organochlorine acaricides, organophosphate acaricides, organothiophosphate acaricides, phosphonate acaricides, phosphoarmidothiolate acaricies, organitin acaricides, phenylsulfonamide acaricides, pyrazolecarboxamide acaricdes, pyrethroid ether acaricide, quatemary ammonium acaricides, pyrethroid ester acaricides, pyrrole acaricides, quinoxaline acaricides, methoxyacrylate strobilurin acaricides, teronic acid acaricides, thiasolidine acaricides, thiocarbamate acaricides, thiourea acaricides, and unclassified acaricides. Examples of miticides for these classes include, but are not limited to, botanical acaricides—carvacrol, sanguinarine; bridged diphenyl acaricides—azobenzene, benzoximate, benzyl, benzoate, bromopropylate, chlorbenside, chlorfenethol, chlorfenson, chlorfensulphide, chlorobenzilate, chloropropylate, cyflumetofen, DDT, dicofol, diphenyl, sulfone, dofenapyn, fenson, fentrifanil, fluorbenside, genit, hexachlorophene, phenproxide, proclonol, tetradifon, tetrasul; carbamate acaricides—benomyl, carbanolate, carbaryl, carbofuran, methiocarb, metolcarb, promacyl, propoxur; oxime carbamate acaricides—aldicarb, butocarboxim, oxamyl, thiocarboxime, thiofanox; carbazate acaricides—bifenazate; dinitrophenol acaricides—binapacryl, dinex, dinobuton, dinocap, dinocap-4, dinocap-6, dinocton, dinopenton, dinosulfon, dinoterbon, DNOC; formamidine acaricides—amitraz, chlordimeform, chloromebuform, formetanate, formparanate, medimeform, semiamitraz; isoxazoline acaricides—afoxolaner, fluralaner, lotilaner, sarolaner; macrocyclic lactone acaricides—tetranactin; avermectin acaricides—abamectin, doramectin, eprinomectin, ivermectin, selamectin; milbemycin acaricides—milbemectin, milbemycin, oxime, moxidectin; mite growth regulators—clofentezine, cyromazine, diflovidazin, dofenapyn, fluazuron, flubenzimine, flucycloxuron, flufenoxuron, hexythiazox; organochlorine acaricides—bromociclen, camphechlor, DDT, dienochlor, endosulfan, lindane; organophosphate acaricides chlorfenvinphos, crotoxyphos, dichlorvos, heptenophos, mevinphos, monocrotophos, naled, TEPP, tetrachlorvinphos; organothiophosphate acaricides—amidithion, amiton, azinphos-ethyl, azinphos-methyl, azothoate, benoxafos, bromophos, bromophos-ethyl, carbophenothion, chlorpyrifos, chlorthiophos, coumaphos, cyanthoate, demeton, demeton-O, demeton-S, demeton-methyl, demeton-O-methyl, demeton-S-methyl, demeton-S-methylsulphon, dialifos, diazinon, dimethoate, dioxathion, disulfoton, endothion, ethion, ethoate-methyl, formothion, malathion, mecarbam, methacrifos, omethoate, oxydeprofos, oxydisulfoton, parathion, phenkapton, phorate, phosalone, phosmet, phostin, phoxim, pirimiphos-methyl, prothidathion, prothoate, pyrimitate, quinalphos, quintiofos, sophamide, sulfotep, thiometon, triazophos, trifenofos, vamidothion; phosphonate acaricides—trichlorfon; phosphoramidothioate acaricides—isocarbophos, methamidophos, propetamphos; phosphorodiamide acaricides—dimefox, mipafox, schradan; organotin acaricides—azocyclotin, cyhexatin, fenbutatin, oxide, phostin; phenylsulfamide acaricides—dichlofluanid; phthalimide acaricides—dialifos, phosmet; pyrazole acaricides—cyenopyrafen, fenpyroximate; phenylpyrazole acaricides—acetoprole, fipronil, vaniliprole; pyrazolecarboxamide acaricides—pyflubumide, tebufenpyrad; pyrethroid ester acaricides—acrinathrin, bifenthrin, brofluthrinate, cyhalothrin, cypermethrin, alpha-cypermethrin, fenpropathrin, fenvalerate, flucythrinate, flumethrin, fluvalinate, tau-fluvalinate, permethrin; pyrethroid ether acaricides—halfenprox; pyrimidinamine acaricides—pyrimidifen; pyrrole acaricides—chlorfenapyr; quatemary ammonium acaricides—sanguinarine; quinoxaline acaricides—chinomethionat, thioquinox; methoxyacrylate strobilurin acaricides—bifujunzhi, fluacrypyrim, flufenoxystrobin, pyriminostrobin; sulfite ester acaricides—aramite, propargite; tetronic acid acaricides—spirodiclofen; tetrazine acaricides, clofentezine, diflovidazin; thiazolidine acaricides—flubenzimine, hexythiazox; thiocarbamate acaricides—fenothiocarb; thiourea acaricides—chloromethiuron, diafenthiuron; unclassified acaricides—acequinocyl, acynonapyr, amidoflumet, arsenous, oxide, clenpirin, closantel, crotamiton, cycloprate, cymiazole, disulfiram, etoxazole, fenazaflor, fenazaquin, fluenetil, mesulfen, MNAF, nifluridide, nikkomycins, pyridaben, sulfiram, sulfluramid, sulfur, thuringiensin, triarathene.

In some embodiments, a miticide can also be selected from abamectin, acephate, acequinocyl, acetamiprid, aldicarb, allethrin, aluminum phosphide, aminocarb, amitraz, azadiractin, azinphos-ethyl, azinphos-methyl, *Bacillus thuringiensis*, bendiocarb, beta-cyfluthrin, bifenazate, bifenthrin, bomyl, buprofezin, calcium cyanide, carbaryl, carbofuran, carbon disulfide, carbon tetrachloride, chlorfenvinphos, chlorobenzilate, chloropicrin, chlorpyrifos, clofentezine, chlorfenapyr, clothianidin, coumaphos, crotoxyphos, crotoxyphos+dichlorvos, cryolite, cyfluthrin, cyromazine, cypermethrin, deet, deltamethrin, demeton, diazinon, dichlofenthion, dichloropropene, dichlorvos, dicofol, dicrotophos, dieldrin, dienochlor, diflubenzuron, dikar (fungicide+miticide), dimethoate, dinocap, dinotefuran, dioxathion, disulfoton, emamectin benzoate, endosulfan, endrin, esfenvalerate, ethion, ethoprop, ethylene dibromide, ethylene dichloride, etoxazole, famphur, fenitrothion, fenoxycarb, fenpropathrin, fenpyroximate, fensulfothion, fenthion, fenvalerate, flonicamid, flucythrinate, fluvalinate, fonofos, formetanate hydrochloride, gamma-cyhalothrin, halofenozide, hexakis, hexythiazox, hydramethylnon, hydrated lime, indoxacarb, imidacloprid, kerosene, kinoprene, lambda-cyhalothrin, lead arsenate, lindane, malathion, mephosfolan, metaldehyde, metam-sodium, methamidophos, methidathion, methiocarb, methomyl, methoprene, methoxychlor, methoxyfenozide, methyl bromide, methyl parathion, mevinphos, mexacarbate, milky spore disease, naled, naphthalene, nicotine sulfate, novaluron, oxamyl, oxydemeton-methyl, oxythioquinox, para-dichlorobenzene, parathion, PCP, permethrin, petroleum oils, phorate, phosalone, phosfolan, phosmet, phosphamidon, phoxim, piperonyl butoxide, pirimicarb, pirimiphos-methyl, profenofos, propargite, propetamphos, propoxur, pymetrozine, pyrethroids—synthetic: see allethrin, permethrin, fenvalerate, resmethrin, pyrethrum, pyridaben, pyriproxyfen, resmethrin, rotenone, s-methoprene, soap, pesticidal, sodium fluoride, spinosad, spiromesifen, sulfotep, sulprofos, temephos, terbufos, tetrachlorvinphos, tetrachlorvinphos+dichlorvos, tetradifon, thiamethoxam, thiodicarb, toxaphene, tralomethrin, trimethacarb, and tebufenozide.

The amount of the biostimulant composition in the pesticide/biostimulant-containing composition can vary. In some embodiments, the amount of biostimulant composition is present at a level of from about 0.05% to about 10% by weight (more preferably from about 0.1% to about 4% by weight, and most preferably from about 0.2% to about 2% by weight) based upon the total weight of the pesticide/biostimulant-containing composition taken as 100% by weight.

Exemplary classes of other biostimulant compositions include, but are not limited to, protein hydrolysates (e.g., amino acids and peptides mixtures obtained by chemical and enzymatic protein hydrolysis from both plant sources and animal wastes), humic acid and fulvic acid containing compositions (e.g., any organic acids that occur naturally in soil, resulting from the decomposition of plant, animal and microbial residues), seaweed extracts and botanicals, chitosan and other biopolymers, inorganic compounds (e.g., minerals such as silica, selenium, cobalt and others which promote plant growth, the quality of plant products and tolerance to abiotic stress), and/or beneficial bacteria and fungi (e.g., *Bacillus* and *Rhizobium* fungi). See Jardin et al., "Plant biostimulants: Definition, concept, main categories and regulation," Scientia Horticulturase, 196, 2015, pp. 3-14, which is hereby incorporated by reference in its entirety.

V. Methods

In some embodiments, the biostimulant compositions are formulated in ways to make their use convenient in the context of productive agriculture. The disclosed biostimulant compositions can be used in methods of promoting plant growth. Methods of promoting plant growth comprise the steps of obtaining a biostimulant composition comprising nitrapyrin; and applying the biostimulant composition to a target area, wherein the biostimulant composition is applied in an amount effective to cause a biostimulating effect. In some embodiments, the target area is an agricultural field, a lawn, a garden, a vineyard, an orchard, a plantation, or a combination thereof.

It will be understood by a person of skill in the art that the effective amount of the biostimulant composition to cause a biostimulating effect can vary as it depends upon factors such as the type of cultivated crop being targeted by the biostimulant composition, the type of application method being used, the type of formulation being used, additional components present in the biostimulant composition (e.g., additional pesticides and/or fertilizers), environmental factors (such as atmospheric temperature and/or moisture content prior/during/and post application, soil characteristics such as pH, heavy metal content, nutrient content, microbial activity, aggregate type, size and stability, composition (e.g., clay and/or sandy) etc.), and the like. In some embodiments, the amount of biostimulant composition to cause a biostimulating effect ranges from about 1 to about 1000 grams/hectare (g/ha), from about 10 to about 750 g/ha, from about 10 to about 500 g/ha, from about 10 to about 475 g/ha, from about 20 to about 450 g/ha, from about 30 to about 440 g/ha, from about 40 to about 440 g/ha, from about 50 to about 440 g/ha, from about 10 to about 150 g/ha, from about 15 to about 100 g/ha, from about 25 to about 75 g/ha, or from about 30 to about 50 g/ha.

In some embodiments, the biostimulant composition as disclosed herein is applied in an effective amount to cause a biostimulating effect. Such a biostimulating effect is characterized by an increase in plant growth of cultivated plants treated with the disclosed biostimulant composition compared to cultivated plants, which were not treated with the biostimulant composition (i.e., untreated cultivated plants). An increase in plant growth is typically measured by at least one method selected from increased leaf area, increased number of leaves, increased dry shoot weight, increased dry leaf weight, increased biomass, increased root length, increased number of roots, increased root dry weight, and a combination thereof.

In some embodiments, the plant growth of cultivated plants treated with the biostimulant composition as disclosed herein is increased up to at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or about 30% compared to the plant growth of untreated cultivated plants (i.e., plants that were not treated with the biostimulant composition). In some embodiments, the plant growth of cultivated plants treated with the biostimulant composition as disclosed herein is increased by an amount of from about 1% to about 30%, from about 1% to about 20%, from about 3% to about 18%, from about 5% to about 15%, or from about 8% to about 12% compared to the plant growth of untreated cultivated plants.

In some embodiments, cultivated plants treated with the biostimulant composition as disclosed herein exhibited an increase in biomass by at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or about 30% compared to the biomass obtained from untreated cultivated plants (i.e., plants that were not treated with the biostimulant composition). In some embodiments, cultivated plants treated with the biostimulant composition as disclosed herein exhibited an increase in biomass by an amount of from about 1% to about 30%, from about 1% to about 25%, from about 5% to about 20%, from about 10% to about 20%, or from about 10% to about 15% compared to the plant growth of untreated cultivated plants.

In some embodiments, the biostimulant composition and/or formulation thereof is applied to the soil of the target area. In some embodiments, the biostimulant composition and/or formulation thereof is applied to the soil containing crops of cultivated plants that have not yet emerged. In some embodiments, the biostimulant composition and/or formulation thereof is applied to the soil containing crops of cultivated plants that have already emerged. In some embodiments, the biostimulant and/or formulation thereof is applied to the soil adjacent to the plants (or stems) and/or in the root zone of the plants.

In some embodiments, the biostimulant compositions and/or formulation is applied directly to plants that have emerged, such as directly applied to one or more plant parts (e.g., foliar application methods).

The number of applications of the biostimulant composition can vary depending on the type of cultivated crop, climate, and the like. A skilled person in the art would be aware of such factors and apply the biostimulant composition accordingly. For example, in some embodiments, the biostimulant composition or formulation thereof is applied at least 1-10 times or at least 1-5 times (or at least 1, 2, 3, 4, 5, 6, 7, 8, 9 or 10 times) during the vegetative/plant development time period of the cultivated plants. In some embodiments, the biostimulant composition or formulation thereof is applied weekly or monthly over a time frame of 1-12 months.

The rate of application of the biostimulant composition or formulation thereof to treat a target area can vary within wide limits and depend on the nature of the soil, the method of application, the prevailing climatic conditions, the target crop, the timing of the application and other factors governed by the method of application. In some embodiments, the biostimulant composition and/or formulation thereof can be applied at an effective rate of between about 10 to about 1,000 mL/acre, 100 to about 1,000 mL/acre, about 250 to about 1,000 mL/acre, 400 to about 900 mL/acre, 500 to about 800 mL/acre, or about 600 to about 700 mL/acre.

In some embodiments, the rate of application of the biostimulant composition or formulation thereof depends on the plant population density present in the target area. In some embodiments, the plant population density ranges from about 1 to about 200,000 plants per acre (plants/acre), from about 100 to about 200,000 plants/acre, from about 1,000 to about 200,000 plants/acre, from about 10,000 to about 175,000 plants/acre, from about 20,0000 to about 150,000 plants/acre, or from about 75,000 to about 125,000 plants/acre.

Thus, in some embodiments, the biostimulant composition or formulation thereof is applied to the target area at an effective rate from about 0.125 to about 1.095 kg/acre based on plant densities ranging from about 25,000 to about 150,000 plants/acre.

In such embodiments, the biostimulant composition or formulation thereof is applied to each plant of the plant population present in the target area at an effective rate, which can vary. In some embodiments, the biostimulant composition or formulation thereof is applied at an effective rate of from about 0.5 to about 0.75 g/plant, 0.05 to about 0.75 g/plant, about 0.05 to about 0.75 g/plant, or about 0.005 to about 0.075 g/plant.

In such embodiments, the biostimulant composition or formulation thereof is applied to each plant of the plant population present in the target area at an effective rate, which can vary. In some embodiments, the biostimulant composition or formulation thereof is applied at an herbicidal amount of from about 0.1 mg to about 20 mg, from about 0.1 to about 17 grams, from about 0.1 mg to about 15 mg, from about 0.5 mg to about 10 mg, from about 0.5 mg to about 5 mg, from about 0.1 mg to about 4 mg, from about 0.1 mg to about 3 mg, from about 0.1 mg to about 2 mg, or from about 0.1 mg to about 1.5 mg per plant of the cultivated crop.

In such embodiments, the biostimulant composition or formulation thereof is used in an amount of from about 0.1 liter/hectare to about 10 liters/hectare (b/ha), from about 0.5 L/ha to about 8 L/ha, from about 1 L/ha to about 5 L/ha, or from about 1 L/ha to about 3 L/ha.

The biostimulant composition can be applied to the target area using application methods that are commonly used in agriculture. Exemplary application methods include, but are not limited to, band application, broadcast application, directed application, spot application and/or foliar application. In such application methods, the biostimulant composition or formulations thereof are applied to the soil, plant part(s), or a combination thereof. In such application methods, the biostimulant composition or formulation thereof can be applied using fertigation, irrigation, drenching, dripping, and/or spraying.

In some embodiments, the biostimulant composition or formulation thereof is applied to the target area using broadcast application methods, which applies the biostimulant composition or formulation thereof non-selectively to the soil and/or plant over the entire target area.

In some embodiments, the biostimulant composition or formulation thereof is applied to the target area using band application methods, which apply the biostimulant composition and/or formulations thereof in the form of narrow strips over the row of cultivated crops. Band application methods use smaller amounts of biostimulant composition or formulation thereof compared to broadcast application methods because the target area is much smaller. In some embodiments, the biostimulant composition or formulation thereof is applied to the soil and/or plant parts of the cultivated crops using this particular application method.

In some embodiments, the biostimulant composition or formulation thereof is applied to the target area using direct application methods. In these types of applications, the biostimulant composition is directly applied to the soil and/or root zone of each plant and/or to one or more plant parts of each plant of cultivated crops in the target area.

In some embodiments, the biostimulant composition or formulation thereof is applied to the target area using spot application methods, which apply the biostimulant composition or formulation thereof to only a portion of cultivated plants of crops present in the target area. In these types of applications, the biostimulant composition is directly applied to the soil and/or root zone of each plant and/or to one or more plant parts of each plant of cultivated crops of a portion of the target area.

The biostimulant composition or formulation thereof can be applied using any known agricultural equipment that is known in the art to carry out such function. Exemplary agricultural equipment includes but is not limited to sprayers (e.g., boom sprayer, spot sprayer, high volume spray truck, backpack sprayer, spray dusters), power-dusters, misters, blanket wipers, rope wick applicator, handheld rope wick wiper, rotary and drop spreaders, irrigation systems, fertigation systems, drenching systems, dripping systems, and the like. A skilled person in the art would be aware of the agricultural equipment that would be suitable for a given biostimulant composition or formulation thereof and application method.

The core of cultivated plants includes plants such as cereals, fruit trees, fruit bushes, grains, legumes and combinations thereof. Exemplary crops include, but are not limited to, rye, oats, maize, rice, sorghum, triticale, oilseed rape, soybeans, sugar beet, sugar cane, turf, fruit trees, palm trees, coconut trees or other nuts, grapes, fruit bushes, fruit plants; beet, fodder beet, pomes, stone fruit, apples, pears, plums, peaches, almonds, cherries, and berries, for example, strawberries, raspberries and blackberries; leguminous plants such as beans, lentils, peas peanuts; oil plants, for example, rape, mustard, sunflowers; cucurbitaceae, for example, marrows, cucumbers, melons; fiber plants, for example, cotton, flax, hemp, jute; citrus fruit, for example, oranges, lemons, grapefruit and mandarins; vegetables, for example, spinach, lettuce, asparagus, cabbages, carrots, onions, tomatoes, potatoes, sweet potatoes, yams, paprika; as well as ornamentals, such as flowers, shrubs, broad leaved trees and evergreens, for example, conifers, cereals, wheat, barley, oats, winter wheat, spring wheat, winter barley, spring barley, triticale, cereal rye, winter durum wheat, spring durum wheat, winter oat, spring oat, fodder cereals, ray-grass, cocksfoot, fescue, timothy, grass for seed and grassland and any combination thereof.

Particular embodiments of the subject matter described herein include.

1. A method of promoting plant growth of cultivated plants, the method comprising the steps of:
   a.) obtaining a biostimulant composition comprising nitrapyrin; and
   b.) applying the biostimulant composition to a target area,
   wherein the biostimulant composition is applied in an amount effective to cause a biostimulating effect, and wherein said method promotes plant growth of cultivated plants present in the target area.
2. The method of embodiment 1, wherein the amount effective to cause a biostimulating effect is from about 0.01 mg/plant to about 17 mg/plant.
3. The method of embodiment 1 or 2, wherein the biostimulant composition comprises nitrapyrin in an amount of about 1% to about 50% by weight based on the total weight of the biostimulant composition.
4. The method of embodiment 3, wherein the biostimulant composition comprises nitrapyrin in an amount of about 12% to about 25% by weight based on the total weight of the biostimulant composition.
5. The method of any above embodiment, wherein the amount effective to cause a biostimulating effect ranges from about 1 to about 1,000 grams/hectare (g/ha).
6. The method of any above embodiment, wherein the amount effective to cause a biostimulating effect ranges from about 10 to about 500 grams/hectare (g/ha).
7. The method of any above embodiment, wherein the biostimulant composition is applied to the soil of the target area containing crops of cultivated plants that have already emerged.
8. The method of any above embodiment, wherein the biostimulant composition is applied using fertigation, irrigation, drenching, dripping, and/or spraying application methods.
9. The method of embodiment 7, wherein the soil of the target area comprises the soil adjacent to stems and/or the root zone of the cultivated plants.
10. The method of any above embodiment, wherein the biostimulant composition is applied to plant parts of the cultivated plants in the target area using foliar application methods.
11. The method of any above embodiment, wherein the biostimulant composition is applied using directed application, spot application, and/or broadcast application methods.
12. The method of any above embodiment, wherein the biostimulant composition is applied to the target area at an effective rate of from about 400 to about 900 mL/acre.
13. The method of any above embodiment, wherein the biostimulant composition is applied at an effective rate of from about 0.005 to about 0.0075 g per plant.
14. The method of any above embodiment, wherein the biostimulant composition is applied to the target area at a rate from about 0.125 to about 1.095 kg/acre based on plant densities ranging from about 25,000 to about 150,000 plants/acre.
15. The method of any above embodiment, wherein the biostimulant composition is used in an amount of from about 1 liter/hectare to about 5 liters/hectare.
16. The method of any above embodiment, wherein the biostimulant composition is used in an amount from about 0.050 to about 0.438 kg/ha, based on planting densities ranging from about 10,000 to about 60,000 plants/ha.
17. The method of any above embodiment, wherein the target area is selected from an agricultural field, a garden, a lawn, an orchard, a vineyard, a plantation, and a combination thereof.
18. The method of any above embodiment, wherein plant growth is increased up to about 20% compared to plants that were not treated with the biostimulant composition.
19. The method of any above embodiment, wherein the plant growth is measured by at least one method selected from increased leaf area, increased number of leaves, increased shoot growth, increased dry shoot weight, increased dry leaf weight, or a combination thereof.
20. The method of any above embodiment, wherein plant growth further comprises increasing plant vigor and wherein plant vigor is increased by up to 20% compared to the plant health of untreated plants.
21. The method of any above embodiment, wherein plant growth further comprises plant vigor and wherein plant vigor is measured in terms of at least one of increased water uptake and/or efficiency, increased nutrient uptake and/or efficiency, increased plant size or growth rate, improved chlorophyll content of leaves, and/or improved quality of fruit, grain, or vegetable.

22. The method of any above embodiment, wherein the biostimulant composition is applied at least once during the vegetative/plant development time period of the cultivated plants.
23. The method of any above embodiment, wherein the crops of cultivated plants are selected from the group consisting of barley, wheat, rye, oats, sorghum, triticale, cotton, oilseed rape, sunflower, maize, rice, soybeans, sugar beet, sugar cane, beet, fodder beet, pomes, stone fruit, apples, pears, plums, peaches, almonds, cherries, strawberries, raspberries, blackberries, beans, lentils, peas, peanuts, mustard, sunflowers, cotton, flax, hemp, jute, spinach, lettuce, asparagus, cabbages, carrots, onions, tomatoes, potatoes, sweet potatoes, yams, paprika, winter wheat, spring wheat, winter barley, spring barley, triticale, cereal rye, winter durum wheat, spring durum wheat, winter oat, spring oat, fodder cereals, ray-grass, cocksfoot, fescue, timothy, and combinations thereof.
24. The method of any above embodiment, wherein the biostimulant composition is formulated into a formulation comprising one or more auxiliaries selected from extenders, carriers, solvents, surfactants (surface-active agents), stabilizers, antifoaming agents, anti-freezing agents, preservatives, antioxidants, viscosity modifiers, suspending agents, light absorbers, corrosion inhibitors, fragrances, pH-modifying substances, glidants, lubricants, plasticizers, complexing agents, colorants, thickeners, solid adherents, fillers, wetting agents, dispersing agents, lubricants, anticaking agents, deformers, and diluents.
25. The method of any above embodiment, wherein the biostimulant composition is in a form selected from a soluble liquid (SF), an emulsifiable concentrate (EC), a wettable powder (WP), a dry flowable (DF), a flowable (F), a water soluble powder (SP), an ultra-low-volume concentrate (ULV), a suspension concentrate (SC), an aqueous suspension (AS), a microencapsulated suspension (ME or MT), a capsule suspension (CS), a granule (G), and a pellet (P).

EXAMPLES

It should be understood that the following Examples are provided by way of illustration only and nothing therein should be taken as a limiting factor.

Example 1. Studies of Nitrapyrin as a Biostimulant

Corn seeds were sown in 3-liter pots filled with a peat-vermiculite-perlite potting mix. Plants were grown for a period of 14 days in a greenhouse under standard conditions (28/32° C. night/day temperatures, 16-hour photoperiod, 55% relative humidity, 800 uMol/m2/s light intensity). Seven days after planting, treatments were applied using a 3×3 factorial treatment design (3 nitrapyrin rates×3 fertilizer treatments), with 4 biological replications per treatment combination. Plants were arranged in a completely randomized layout on the greenhouse bench. Nitrapyrin rates were: 0.0 g/plant (acetonitrile only), 0.0005 g/plant and 0.00073 g/plant, with each treatment unit dissolved in 5 mL of acetonitrile. Fertilizer treatments were: No fertilizer (water only), 15-5-15, and 6-24-6. Fertilizers were delivered at a rate of 100 ppm nitrogen, 3 times/week beginning on day 7 through day 14. Nitrapyrin treatments were given only once on day 7. Plants were monitored for signs of phytotoxicity during the experiment. On day 14, plants were harvested and dried in a forced-air oven. Dried plants were weighed individually for biomass. For results see FIG. 1.

Figure 2:
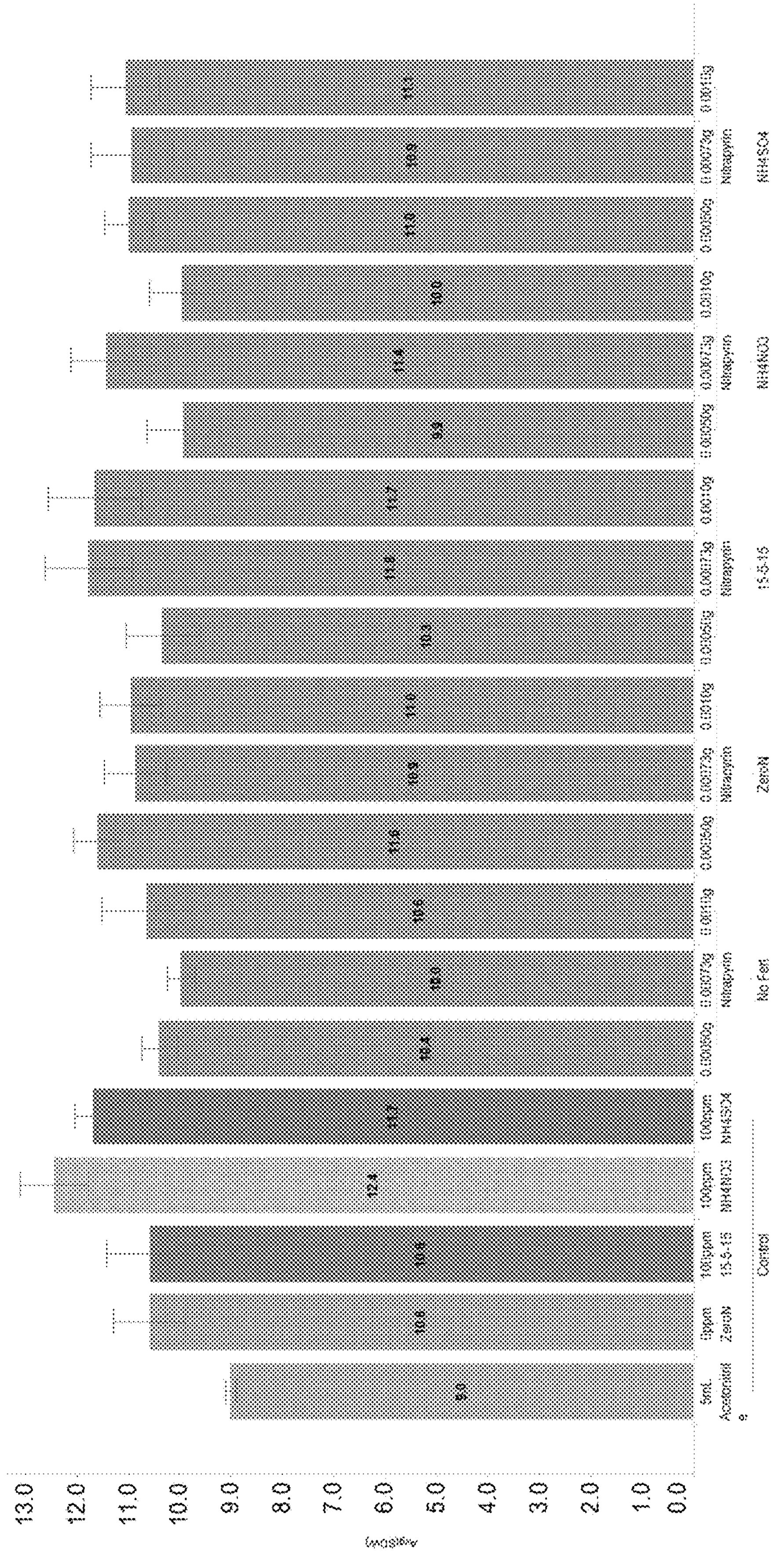
FIG. 2 is a bar graph showing the short dry weight of 21-day-old corn seedlings. Nitrapyrin was applied to the soil at two different label rates with and without NPK fertilizers with guaranteed analysis of 15-5-15 and 6-24-6. Various control plants are shown as well.

A second experiment was performed with the same execution as described above, but with additional treatment groups and additional growing time (21 days). Treatments were applied using a 4×5 factorial treatment design (4 nitrapyrin rates×5 fertilizer treatments), with 4 biological replications per treatment combination. Nitrapyrin rates were: 0.0 g/plant (acetonitrile only), 0.0005 g/plant, 0.00073 g/plant, and 0.0010 g/plant. Fertilizer treatments were: No fertilizer (water only), ammonium nitrate 100 ppm N, ammonium sulfate 100 ppm N, 15-5-15 100 ppm N, and Zero N fertilizer containing all nutrients except nitrogen. All other experimental factors were identical to the above experiment. For results, see FIG. 2.

All technical and scientific terms used herein have the same meaning. Efforts have been made to ensure accuracy with respect to numbers used (e.g., amounts, temperature, etc.) but some experimental errors and deviations should be accounted for.

As used herein, the term "about," when referring to a value, is meant to encompass variations of in some embodiments ±5%, in some embodiments ±2%, in some embodiments ±1%, in some embodiments ±0.5%, in some embodiments ±0.1% from the specified amount, as such variations are appropriate to perform the disclosed methods or employ the disclosed compositions.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges which may independently be included in the smaller rangers are also encompassed, subject to any specifically excluded limit in the stated range. Where the stated range includes one or both of the limits, ranges excluding either or both of those included limits are also included.

Many modifications and other embodiments set forth herein will come to mind to one skilled in the art to which this subject matter pertains having the benefit of the teachings presented in the foregoing descriptions and the associated drawings. Therefore, it is to be understood that the subject matter is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method of promoting plant growth of cultivated plants, the method comprising the steps of:
a.) obtaining a biostimulant composition comprising nitrapyrin in an amount of about 1% to about 50% by weight based on the total weight of the biostimulant composition; and
b.) applying the biostimulant composition to soil of a target area at an effective rate from about 0.005 to about 0.075 g/plant,
wherein the biostimulant composition is applied in an amount effective to cause a biostimulating effect, and
wherein said method promotes plant growth of cultivated plants present in the target area.

2. The method of claim 1, wherein the amount effective to cause a biostimulating effect is from about 0.01 mg/plant to about 17 mg/plant.

3. The method of claim 1, wherein the biostimulant composition comprises nitrapyrin in an amount of about 12% to about 25% by weight based on the total weight of the biostimulant composition.

4. The method of claim 1, wherein the amount effective to cause a biostimulating effect ranges from about 10 to about 500 grams/hectare (g/ha).

5. The method of claim 1, wherein the biostimulant composition is applied to the soil of the target area containing crops of cultivated plants that have already emerged.

6. The method of claim 1, wherein the biostimulant composition is applied using fertigation, irrigation, drenching, dripping, and/or spraying application methods.

7. The method of claim 5, wherein the soil of the target area comprises the soil adjacent to stems and/or the root zone of the cultivated plants.

8. The method of claim 1, wherein the biostimulant composition is applied to plant parts of the cultivated plants in the target area using foliar application methods.

9. The method of claim 1, wherein the biostimulant composition is applied using directed application, spot application, and/or broadcast application methods.

10. The method of claim 1, wherein the biostimulant composition is applied to the target area at an effective rate of from about 400 to about 900 mL/acre.

11. The method of claim 1, wherein the biostimulant composition is applied at an effective rate of from about 0.005 to about 0.0075 g per plant.

12. The method of claim 1, wherein the biostimulant composition is applied to the target area at a rate from about 0.125 to about 1.095 kg/acre based on plant densities ranging from about 25,000 to about 150,000 plants/acre.

13. The method of claim 1, wherein the biostimulant composition is used in an amount from about 0.050 to about 0.438 kg/ha, based on planting densities ranging from about 10,000 to about 60,000 plants/ha.

14. The method of claim 1, wherein the target area is selected from an agricultural field, a garden, a lawn, an orchard, a vineyard, a plantation, and a combination thereof.

15. The method of claim 1, wherein plant growth is increased up to about 20% compared to plants that were not treated with the biostimulant composition, wherein plant growth is measured by at least one method selected from increased leaf area, increased number of leaves, increased shoot growth, increased dry shoot weight, increased dry leaf weight, or a combination thereof.

16. The method of claim 15, wherein plant growth further comprises increasing plant vigor and, wherein plant vigor is measured in terms of at least one of increased water uptake and/or efficiency, increased nutrient uptake and/or efficiency, increased plant size or growth rate, improved chlorophyll content of leaves, and/or improved quality of fruit, grain, or vegetable.

17. The method of claim 1, wherein the biostimulant composition is applied at least once during the vegetative/plant development time period of the cultivated plants.

18. The method of claim 1, wherein the cultivated plants are selected from the group consisting of barley, wheat, rye, oats, sorghum, triticale, oilseed rape, maize, rice, soybeans, sugar beet, sugar cane, beet, fodder beet, pomes, stone fruit, apples, pears, plums, peaches, almonds, cherries, strawberries, raspberries, blackberries, beans, lentils, peas, peanuts, mustard, sunflowers, cotton, flax, hemp, jute, spinach, lettuce, asparagus, cabbages, carrots, onions, tomatoes, potatoes, sweet potatoes, yams, paprika, winter wheat, spring wheat, winter barley, spring barley, triticale, cereal rye, winter durum wheat, spring durum wheat, winter oat, spring oat, fodder cereals, ray-grass, cocksfoot, fescue, timothy, and combinations thereof.

19. The method of claim 1, wherein the biostimulant composition is formulated into a formulation comprising one or more auxiliaries selected from extenders, carriers, solvents, surfactants, stabilizers, antifoaming agents, anti-freezing agents, preservatives, antioxidants, viscosity modifiers, suspending agents, light absorbers, corrosion inhibitors, fragrances, pH-modifying substances, glidants, lubricants, plasticizers, complexing agents, colorants, thickeners, solid adherents, fillers, wetting agents, dispersing agents, lubricants, anticaking agents, deformers, and diluents.

20. The method of claim 19, wherein the biostimulant composition is in a form selected from a soluble liquid (SF), an emulsifiable concentrate (EC), a wettable powder (WP), a dry flowable (DF), a flowable (F), a water soluble powder (SP), an ultra-low-volume concentrate (ULV), a suspension concentrate (SC), an aqueous suspension (AS), a microencapsulated suspension (ME or MT), a capsule suspension (CS), a granule (G), a pellet (P), a ready-to-use formulation, a premix formulation, or a tank mix formulation.

* * * * *